US010855457B1

(12) United States Patent
Vakili

(10) Patent No.: US 10,855,457 B1
(45) Date of Patent: Dec. 1, 2020

(54) SYSTEMS AND METHODS FOR SINGLE CHIP QUANTUM RANDOM NUMBER GENERATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 271 days.

(21) Appl. No.: 16/105,749

(22) Filed: Aug. 20, 2018

(51) Int. Cl.
| H04L 9/08 | (2006.01) |
| H04L 29/08 | (2006.01) |
| H04B 10/70 | (2013.01) |

(52) U.S. Cl.
CPC .......... *H04L 9/0858* (2013.01); *H04B 10/70* (2013.01); *H04L 9/0869* (2013.01); *H04L 67/146* (2013.01)

(58) Field of Classification Search
CPC ... H04L 9/0858; H04L 67/146; H04L 9/0869; H04B 10/70
See application file for complete search history.

(56) References Cited

U.S. PATENT DOCUMENTS

| 5,515,438 | A | 5/1996 | Bennett et al. |
| 7,324,647 | B1 * | 1/2008 | Elliott ............... H04B 10/70 370/390 |
| 7,333,611 | B1 | 2/2008 | Yuen et al. |
| 7,460,669 | B2 * | 12/2008 | Foden ............... H04L 9/0858 380/256 |
| 7,649,996 | B2 | 1/2010 | Nishioka et al. |
| 7,697,693 | B1 | 4/2010 | Elliott |
| 7,787,628 | B2 | 8/2010 | Kuang et al. |
| 8,332,730 | B2 | 12/2012 | Harrison et al. |
| 8,693,691 | B2 | 4/2014 | Jacobs |
| 8,755,525 | B2 | 6/2014 | Wiseman |
| 8,855,316 | B2 | 10/2014 | Wiseman et al. |
| 9,036,817 | B1 | 5/2015 | Hunt et al. |

(Continued)

FOREIGN PATENT DOCUMENTS

| CN | 107040378 A | 8/2017 |
| WO | 2017/108539 A1 | 6/2017 |

OTHER PUBLICATIONS

Non-Final Office Action dated Jan. 16, 2020 for U.S. Appl. No. 16/712,338.

(Continued)

*Primary Examiner* — Christopher C Harris
(74) *Attorney, Agent, or Firm* — Alston & Bird LLP

(57) ABSTRACT

Systems, apparatuses, methods, and computer program products are disclosed for quantum random number generation (QRNG). An example method includes generating, by encoding circuitry of a QRNG chip, a series of photons and transmitting the series of photons over an optical line. The example method further includes determining, by decoding circuitry of the QRNG chip, a set of quantum bases to use for measurement. The example method further includes receiving, by the decoding circuitry of the QRNG chip, the series of photons over the optical line and decoding the series of photons based on the determined set of quantum bases to generate a decoded set of bits. In some embodiments, the example method further includes generating, by session authentication circuitry, a session key based on the decoded set of bits.

20 Claims, 13 Drawing Sheets

(56) References Cited

U.S. PATENT DOCUMENTS

| | | | |
|---|---|---|---|
| 9,083,684 | B2 | 7/2015 | Tanizawa et al. |
| 9,184,912 | B2 | 11/2015 | Harrington |
| 9,191,198 | B2 | 11/2015 | Harrison et al. |
| 9,680,640 | B2 | 6/2017 | Hughes et al. |
| 9,692,595 | B2 | 6/2017 | Lowans et al. |
| 10,439,806 | B2 | 10/2019 | Fu et al. |
| 10,540,146 | B1 | 1/2020 | Vakili |
| 10,587,402 | B2 | 3/2020 | Nordholt et al. |
| 2004/0109564 | A1* | 6/2004 | Cerf ............ H04L 9/0858 380/256 |
| 2004/0238813 | A1 | 12/2004 | Lidar et al. |
| 2005/0036624 | A1 | 2/2005 | Kent et al. |
| 2005/0249352 | A1 | 11/2005 | Choi et al. |
| 2006/0056630 | A1 | 3/2006 | Zimmer et al. |
| 2006/0263096 | A1 | 11/2006 | Dinu et al. |
| 2007/0260658 | A1 | 11/2007 | Fiorentino et al. |
| 2008/0076525 | A1 | 3/2008 | Kim |
| 2009/0180615 | A1 | 7/2009 | Trifonov |
| 2011/0126011 | A1 | 5/2011 | Choi et al. |
| 2011/0173696 | A1* | 7/2011 | Dynes ............ H04L 9/0858 726/22 |
| 2011/0213979 | A1* | 9/2011 | Wiseman ............ H04L 9/0855 713/171 |
| 2013/0083926 | A1 | 4/2013 | Hughes et al. |
| 2013/0101119 | A1 | 4/2013 | Nordholt et al. |
| 2013/0101121 | A1 | 4/2013 | Nordholt et al. |
| 2013/0163759 | A1 | 6/2013 | Harrison et al. |
| 2013/0251145 | A1* | 9/2013 | Lowans ............ H04L 9/0858 380/44 |
| 2013/0315395 | A1 | 11/2013 | Jacobs |
| 2015/0188701 | A1 | 7/2015 | Nordholt et al. |
| 2015/0222619 | A1 | 8/2015 | Hughes et al. |
| 2016/0028542 | A1 | 1/2016 | Choi et al. |
| 2016/0248586 | A1 | 8/2016 | Hughes et al. |
| 2016/0328211 | A1 | 11/2016 | Nordholt et al. |
| 2016/0352515 | A1 | 12/2016 | Bunandar et al. |
| 2017/0126654 | A1 | 5/2017 | Fu |
| 2017/0214525 | A1 | 7/2017 | Zhao et al. |
| 2017/0222731 | A1 | 8/2017 | Lucamarini et al. |
| 2017/0324551 | A1 | 11/2017 | Ahn |
| 2017/0324552 | A1 | 11/2017 | Ahn |
| 2017/0331623 | A1 | 11/2017 | Fu et al. |
| 2017/0338951 | A1 | 11/2017 | Fu et al. |
| 2017/0338952 | A1 | 11/2017 | Hong et al. |
| 2018/0069698 | A1* | 3/2018 | Hong ............ H04L 9/0869 |
| 2018/0198608 | A1* | 7/2018 | Nordholt ............ H04L 9/0852 |
| 2018/0269989 | A1* | 9/2018 | Murakami ............ H04B 10/70 |
| 2019/0007215 | A1 | 1/2019 | Hakuta et al. |
| 2019/0020469 | A1 | 1/2019 | Dottax et al. |
| 2019/0129694 | A1 | 5/2019 | Benton et al. |
| 2019/0238326 | A1 | 8/2019 | Ji et al. |
| 2019/0243611 | A1 | 8/2019 | Martin et al. |
| 2019/0268146 | A1 | 8/2019 | Samid |
| 2019/0289006 | A1 | 9/2019 | Fang et al. |
| 2020/0153619 | A1 | 5/2020 | Ribordy |

OTHER PUBLICATIONS

Armanuzzaman, Md. et al. A Secure and Efficient Data Transmission Technique Using Quantum Key Distribution. 2017 4th International Conference on Networking, Systems and Security (NSysS). https://ieeexplore.ieee.org/stamp/stamp.jsp?tp=&arnumber=8267797 (Year: 2017).

Liu, Zhihao et al. Mutually Authenticated Quantum Key Distribution Based on Entanglement Swapping. 2009 Pacific-Asia Conference on Circuits, Communications and Systems. https://ieeexplore.ieee.org/stamp/stamp.jsp?tp=&arnumber=5232366 (Year:2009).

Ronczka, John. Backchanneling Quantum Bit (Qubit) Shuffling1: Quantum Bit (Qubit) 'Shuffling' as Added Security by Slipstreaming Q-Morse. 2016 3rd Asia-Pacific World Congress on Computer Science and Engineering (APWC on CSE). https://ieeexplore.ieee.org/stamp/stamp.jsp?tp=&arnumber=7941948 (Year: 2016).

Charjan, S. et al., "Quantum Key Distribution by Exploitation Public Key Cryptography (ECC) in Resource Constrained Devices," International Journal of Emerging Engineering Research and Technology, 3(7): 5-12, (2015).

Non-Final Rejection for U.S. Appl. No. 15/916,763, dated Oct. 30, 2019.

Non-Final Rejection for U.S. Appl. No. 16/105,294, dated Nov. 12, 2019.

Non-Final Rejection for U.S. Appl. No. 16/105,370, dated Nov. 8, 2019.

Pandya, M., "Securing Clouds—The Quantum Way," arXiv preprint arXiv:1512.02196, 16 pages, (2015).

Sirdhar, S. et al., Intelligent Security Framework for IoT Devices Cryptography based End-To-End security Architecture, International Conference on Inventive Systems and Control (ICISC-2017) 1-5.

Mohammad, Omer K. et al., Statistical Analysis for Random Bits Generation on Quantum Key Distribution, Cyber Warfare and Digital Forensic (CyberSec), 2014 Third International Conference (2014) 45-51.

Liu, D. et al., A Communication Model in Multilevel Security Network Using Quantum Key, Chinese Automation Congress (CAC) (2015) 915-918.

Hong, K. W. et al., Challenges in Quantum Key Distribution: A Review, ACM Proceeding (2016) 29-33.

Debuisschert, T. et al., Strenghtening Classical Symmetric Encryption with Continuous Variable Quantum Key Distribution, CLEO Technical Digest, OSA (2012), 2 pages.

Abubakar, M. Y. et al., Two Channel Quantum Security Modelling Focusing on Quantum Key Distribution Technique, IT Convergence and Security (ICITCS), 2015 5th International Conference (2015) 5 pages.

Garcia-Escartin, Juan Carlos; Chamorro-Posada, Pedro. Hidden Probe Attacks on Ultralong Fiber Laser Key Distribution Systems. IEEE Journal of Selected Topics in Quantum Electronics (vol. 24, Issue: 3, May-Jun. 2018). https://ieeexplore.ieee.org/stamp/stamp.jsp?tp=&arnumber=8219358 (Year: 2018).

Imany, Poolad et al. Demonstration of frequency-bin entanglement in an integrated optical microresonator. 2017 Conference on Lasers and Electro-Optics (CLEO). https://ieeexplore.ieee.org/stamp/stamp.jsp?tp=&arnumber=8083593 (Year: 2017).

Price, Alasdair B. et al. High-Speed Quantum Key Distribution with Wavelength-Division Multiplexing on Integrated Photonic Devices. 2018 Conference on Lasers and Electro-Optics (CLEO). https://ieeexplore.ieee.org/stamp/stamp.jsp?tp=&arnumber=8426886 (Year: 2018).

Bienfang, J.C. et al. Quantum generated one-time-pad encryption with 1.25 Gbps clock synchronization. 2005 OFC/NFOEC Technical Digest. Optical Fiber Communication Conference. https://ieeexplore.ieee.org/stamp/stamp.jsp?tp=&arnumber=1501276 (Year: 2005).

Chen, Wei et al. Field Experiment on a "Star Type" Metropolitan Quantum Key Distribution Network. IEEE Photonics Technology Letters, vol. 21, Issue: 9. https://ieeexplore.ieee.org/stamp/stamp.isp?tp=&arnumber=4787043 (Year: 2009).

Elboukhari, Mohamed et al. Implementation of secure key distribution based on quantum cryptography. 2009 International Conference on Multimedia Computing and Systems. https://ieeexplore.ieee.org/stamp/stamp.jsp?tp=&arnumber=5256673 (Year:2009).

Thangavel, T. S.; Krishnan, A. Performance of integrated quantum and classical cryptographic model for password authentication. https://ieeexplore.ieee.org/stamp/stamp.jsp?tp=&arnumber=5591718 (Year: 2010).

\* cited by examiner

| On-Chip Encoder | Encoded Set of Bits | 1 | 1 | 0 | 0 | 0 | 1 | 1 | 0 |
|---|---|---|---|---|---|---|---|---|---|
| On-Chip Decoder | Decoded Set of Bits | 1 | 0 | 0 | 0 | 0 | 0 | 1 | 0 |
| | Correctness | Correct | Error | Correct | Correct | Correct | Error | Correct | Correct |

SYSTEMS AND METHODS FOR SINGLE CHIP QUANTUM RANDOM NUMBER GENERATION

TECHNOLOGICAL FIELD

Example embodiments of the present disclosure relate generally to session authentication and, more particularly, to systems and methods for single chip quantum random number generation.

BACKGROUND

Session authentication may describe various techniques for securing electronic communications between two computing devices, such as a server device and a client device, using a unique session key or identifier (ID). Selecting a session key that cannot be guessed is thus an important element of preventing attacks whereby a perpetrator derives the session key and then uses it to intercept communications by tapping into the communication path between the server device and the client device.

Generating session IDs to be used in session authentication often relies upon the use of pseudo-random number generation. While often referred to as "random number generation," in truth it has historically been difficult to generate truly random numbers, and tools for "random" number generation have usually employed procedures whose outputs can be reproduced if certain underlying inputs are known. And while historically such pseudo-random number generation has been sufficient to generate session IDs that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, because perpetrators have a greater ability to determine the method by which a session key is pseudo-randomly generated, replicate the method to generate the same session key, and then break into a user's session.

BRIEF SUMMARY

Systems, apparatuses, methods, and computer program products are disclosed herein for improved session authentication. The session authentication system provided herein solves the above problems by generating and transmitting photons and, subsequently, receiving and decoding those photons using a determined set of quantum bases in order to inject true randomness into the process for generating session keys or seeds for a pseudorandom number generation process used to establish secure sessions at multiple session servers.

In one example embodiment, a system is provided for quantum random number generation. The system may comprise a quantum random number generation chip comprising encoding circuitry configured to generate a series of photons and transmit the series of photons over an optical line. The quantum random number generation chip may further comprise decoding circuitry configured to determine a set of quantum bases to use for measurement. The decoding circuitry may be further configured to receive the series of photons over the optical line and decode, based on the determined set of quantum bases, the series of photons to generate a decoded set of bits. In some embodiments, the system may further comprise session authentication circuitry configured to generate a session key based on the decoded set of bits.

In another example embodiment, an apparatus is provided for quantum random number generation. The apparatus may comprise a quantum random number generation chip comprising encoding circuitry configured to generate a series of photons and transmit the series of photons over an optical line. The quantum random number generation chip may further comprise decoding circuitry configured to determine a set of quantum bases to use for measurement. The decoding circuitry may be further configured to receive the series of photons over the optical line and decode, based on the determined set of quantum bases, the series of photons to generate a decoded set of bits. In some embodiments, the apparatus may further comprise session authentication circuitry configured to generate a session key based on the decoded set of bits.

In another example embodiment, a method is provided for quantum random number generation. The method may comprise generating, by encoding circuitry of a quantum random number generation chip, a series of photons. The method may further comprise transmitting, by the encoding circuitry of the quantum random number generation chip, the series of photons over an optical line. The method may further comprise determining, by decoding circuitry of the quantum random number generation chip, a set of quantum bases to use for measurement. The method may further comprise receiving, by the decoding circuitry of the quantum random number generation chip, the series of photons over the optical line. The method may further comprise decoding, by the decoding circuitry of the quantum random number generation chip and based on the determined set of quantum bases, the series of photons to generate a decoded set of bits. In some embodiments, the method may further comprise generating, by session authentication circuitry, a session key based on the decoded set of bits.

In another example embodiment, a computer program product is provided for quantum random number generation. The computer program product comprises at least one non-transitory computer-readable storage medium storing program instructions that, when executed, may cause a quantum random number generation chip to generate a series of photons. The program instructions, when executed, may further cause the quantum random number generation chip to transmit the series of photons over an optical line. The program instructions, when executed, may further cause the quantum random number generation chip to determine a set of quantum bases to use for measurement. The program instructions, when executed, may further cause the quantum random number generation chip to receive the series of photons over the optical line. The program instructions, when executed, may further cause the quantum random number generation chip to decode, based on the determined set of quantum bases, the series of photons to generate a decoded set of bits. In some embodiments, the program instructions, when executed, may further cause generation of a session key based on the decoded set of bits.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIG. 6 illustrates example sets of bits in accordance with some example embodiments described herein.

DETAILED DESCRIPTION

Figure 1:
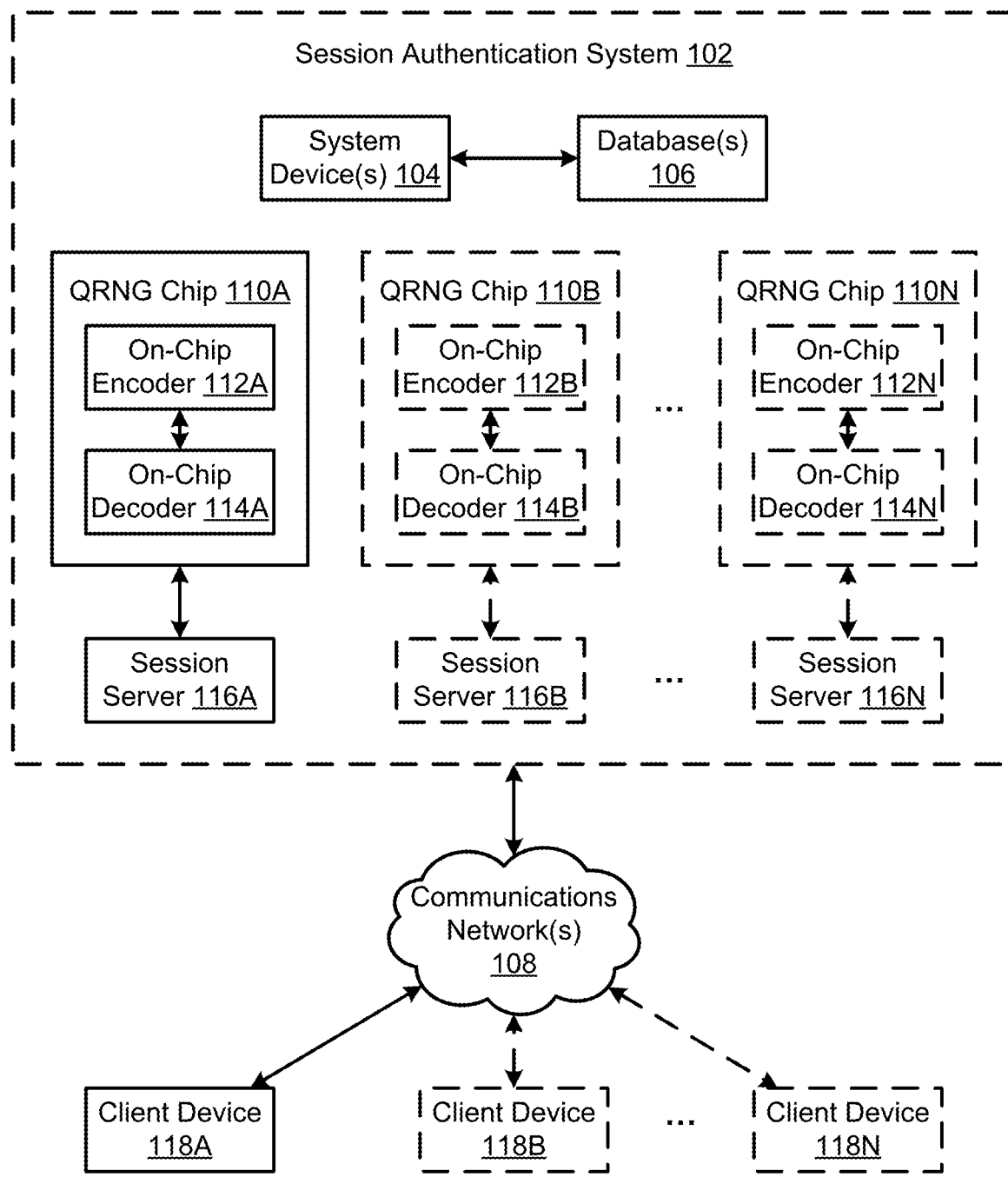
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for session authentication. Traditionally, it has been very difficult to select or generate a robust session key or ID (e.g., a unique number that is unlikely to be guessed or deciphered by a third party). In addition, there is typically no way to prove that the session ID is unattainable by a third party perpetrator. In an attempt to transmit session IDs that are unattainable by a perpetrator, quantum key distribution (QKD) systems have been developed. In general terms, QKD systems exchange keys between two parties in a secure way that cannot be guessed. For instance, a one-time-pad quantum key exchange is impenetrable because a potential perpetrator eavesdropping on the transmission of a set of qubits representing a key will necessarily induce errors in the set of qubits due to quantum uncertainty, alerting the two parties to the attempted eavesdropping.

In contrast to these conventional QKD systems for transmitting secret keys securely, the present disclosure relates to a mechanism for generating unique keys in the first place. To do this, a session authentication system comprises one or more quantum random number generation (QRNG) chips that utilize quantum uncertainty and the indeterminacy of quantum states to encode (e.g., generate) and decode (e.g., measure) random sets of bits in order to generate random numbers. The present disclosure provides multiple embodiments of the QRNG chip. For example, the QRNG chip may be a polarization-based QRNG chip (e.g., as discussed with reference to FIGS. 3A-3B), a Mach-Zehnder interferometry-based (MZI-based) QRNG chip (e.g., as discussed with reference to FIGS. 4A-4C), a double-slit-based QRNG chip (e.g., as discussed with reference to FIGS. 5A-5B), any other suitable QRNG chip, or a combination thereof. Subsequently, the session authentication system may use the generated random numbers to generate session keys or random seeds (e.g., sets of bits that are randomized due to quantum effects such as the principle of quantum uncertainty and the indeterminacy of quantum states) for pseudo-random number generation used to establish a secure session. As such, the session authentication system disclosed herein introduces random errors in the decoded bits based on quantum uncertainty and the indeterminacy of quantum states. These random errors can then prevent the reproduction of session keys by malicious attackers.

There are many advantages of these and other embodiments described herein, such as: providing a session key that has truly random elements, and, as a result, facilitating the generation of a session ID that cannot be reproduced by a third party.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, such as pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state |1> and the spin down state |0>); the energy level of a single atom (e.g., a superconducting qubit); or any other suitable qubit.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. In some embodiments, a first optoelectronic device may include a first MZI configured to generate time-bin qubits and transmit the generated time-bin qubits over an optical line, and a second optoelectronic device may include a second MZI configured to measure time-bin qubits received over the optical line. The characteristics of the first MZI, such as optical path length, may be different from the characteristics of the second MZI such that the first MZI and the second MZI may be considered asymmetrical MZIs. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more on-chip encoders, on-chip decoders, laser devices, client devices, server devices, remote servers, cloud-based servers, cloud utilities, or other devices.

FIG. 1 illustrates a system diagram of a set of devices that may be involved in some example embodiments described herein. In this regard, FIG. 1 discloses an example environment 100 within which embodiments of the present disclosure may operate to authenticate sessions between devices. As illustrated, a session authentication system 102 may include one or more session authentication system server devices 104 in communication with one or more databases 106. The session authentication system 102 may further comprise one or more on-chip encoders 112A-112N and one or more corresponding on-chip decoders 114A-114N. The one or more on-chip encoders 112A-112N may be connected to the one or more on-chip decoders 114A-114N through one or more corresponding quantum lines. The one or more on-chip decoders 114A-114N are, in turn, communicatively coupled to corresponding session servers 116A-116N. Each session server 116 may be in communication with one or more client devices 118A-118N through a communications network 108 or a non-network communications path. A given session server 116 may generate session IDs based on data received from a corresponding on-chip decoder 114 to facilitate secure authentication of a communication session between the given session server 116 and one or more client devices 118A-118N as described in further detail below.

The session authentication system 102 may be embodied as one or more computers or computing systems as known in the art. The one or more session authentication system server devices 104 may be embodied as one or more servers, remote servers, cloud-based servers (e.g., cloud utilities), processors, or any other suitable server devices, or any combination thereof. The one or more session authentication system server devices 104 may receive, process, generate, and transmit data, signals, and electronic information to facilitate the operations of the session authentication system 102. The one or more session authentication system databases 106 may be embodied as one or more data storage devices, such as a Network Attached Storage (NAS) device or devices, or as one or more separate databases or servers. The one or more session authentication system databases 106 may store information accessed by the session authentication system 102 to facilitate the operations of the session authentication system 102. For example, the one or more session authentication system databases 106 may store quantum bases, control signals, device characteristics, and access credentials for modifying on-chip encoders 112A-112N, on-chip decoders 114A-114N, and/or session servers 116A-116N, and may store device characteristics and/or user account credentials for one or more of the client devices 118A-118N.

Each QRNG chip 110 may be embodied by any suitable QRNG chip configured to generate a random set of bits, such as a decoded set of bits as described herein. For example, the QRNG chip may be a polarization-based QRNG chip (e.g., as discussed with reference to FIGS. 3A-3B), an MZI-based QRNG chip (e.g., as discussed with reference to FIGS. 4A-4C), a double-slit-based QRNG chip (e.g., as discussed with reference to FIGS. 5A-5B), any other suitable QRNG chip, or a combination thereof. Each QRNG chip 110 may comprise an on-chip encoder 112 and an on-chip decoder 114. In some embodiments, the one or more QRNG chips 110A-110N may comprise one or more non-polarization maintaining optical transmission paths to introduce additional error (e.g., to scramble the photons or qubits transmitted through the paths).

The one or more on-chip encoders 112A-112N may be embodied by any suitable on-chip encoder, such as an edge-emitting laser, a single photon source, or an electron source. The one or more on-chip decoders 114A-114N may be embodied by any suitable on-chip decoder, such as a qubit decoder, MZI, or detector. The one or more on-chip decoders 114A-114N are communicatively coupled to corresponding on-chip encoders 112A-112N by corresponding quantum lines and are configured to receive a series of photons, a set of qubits, or both from the corresponding on-chip encoders 112A-112N over the corresponding quantum lines. The one or more on-chip decoders 114A-114N are further configured to decode a received series of photons, set of qubits, or both to generate a decoded set of bits. The decoded set of bits will include a random component as a result of quantum uncertainty and the indeterminacy of quantum states.

In some embodiments, the one or more QRNG chips 110A-110N may include or store various data and electronic information. For example, a given QRNG chip 110 may include or store one or more databases, maps, tables, control signals, electronic information, photon generation schedules, encoding schedules, decoding schedules, pseudo-random quantum basis selection techniques, pseudo-random optical path length determination techniques, any other suitable data, or any combination thereof. Alternatively, another component of the session authentication system 102 may store this information (e.g., database 106). In some embodiments, the one or more QRNG chips 110A-110N may include programmable firmware for receiving control signals and electronic instructions.

In some such embodiments, the one or more QRNG chips 110A-110N may be without network connection capability and incapable of communicating with a communications network (e.g., one or more communications networks 108) or even with other components within the session authentication system 102. When foregoing network connection capability in this fashion, a QRNG chip 110 is incapable of transmitting the settings used to encode photons or qubits, and communications security is, in some instances, improved because a perpetrator may not be able to acquire those settings.

In some embodiments, which are not shown in FIG. 1 for the sake of brevity, each on-chip encoder 112 may be communicatively coupled to one or more on-chip switching devices through one or more optical or quantum lines. In some embodiments, each on-chip switching device may be communicatively coupled to one or more on-chip decoders 114 through one or more optical or quantum lines. The one or more on-chip switching devices may be embodied by any suitable switching device, such as a non-polarization maintaining switching device, a PM switching device, an optical switching device, an electro-optical switching device, a microelectromechanical systems (MEMS) switching device, a non-polarization maintaining fiber coupling, a PMF coupling, a splitter, or any other suitable device. In some instances, the one or more on-chip switching devices may comprise one or more non-polarization maintaining switches that are non-mechanical and operate with all optical fast-switching components with less than 0.5 dB of loss. In some instances, the one or more on-chip switching devices may comprise one or more PM switches that are non-mechanical, operate with all optical fast-switching components with less than 0.5 dB of loss, and have been tested over millions of PM switches without a loss in a single photon polarization state. In some instances, the one or more on-chip switching devices may comprise one or more all-optical PM switches that use polarization maintaining couplers and PM fibers to achieve very high speed modulation with no loss of polarization state. In some embodiments, each of the one or more switching devices may be embodied by a plurality of cascading switching devices. For example, the one or more on-chip switching devices may be embodied by three cascading switching devices. In some embodiments, non-polarization maintaining optical fiber and switches may be used to ensure that the state of the photon is not maintained and to provide for an increased level of randomness. In some embodiments, the one or more on-chip switching devices may be configured to switch between optical lines at a frequency greater than one megahertz (MHz). In these embodiments, the session authentication system 102 may be configured to authenticate over 100,000 sessions at the same time (or at nearly the same time).

Each of the one or more session servers 116A-116N may be embodied as one or more servers, remote servers, cloud-based servers (e.g., cloud utilities), processors, or any other suitable server devices, or any combination thereof. Each session server 116 may manage session authentication for one or more client devices 118A-118N. In this regard, a session server 116 may be configured to generate a number based on a set of bits received from a corresponding on-chip decoder 114. In some embodiments, the generated number may comprise an entirety of the received set of bits. But in other embodiments, the generated number may comprise a fraction—but not all—of the other bits in the decoded set of bits. In some embodiments, the generated number cannot be reproduced without the first quantum basis, the first set of bits, and the second quantum basis. But even with all of this information, the generated number cannot reliably be recreated due to the randomization introduced by the quantum effect triggered from use of divergent sets of quantum bases during encoding and decoding of the set of qubits. In some embodiments, the one or more on-chip decoders 114A-114N may be configured to transmit, o other components within the session authentication system 102, electronic information indicative of the sets of quantum bases they respectively use for decoding received sets of qubits. In some embodiments, the one or more on-chip decoders 114A-114N may be configured to not transmit any electronic information indicative of quantum bases to any other device.

Each of the one or more session servers 116A-116N may be configured to authenticate a session based on a generated number. In some embodiments, each of the one or more session servers 116A-116N may be configured to generate a session key based on the generated number. In some embodiments, the one or more session servers 116A-116N may be configured to generate a seed for pseudo-random number generation based on the generated number, and generate a pseudo-random number based on the seed, wherein generation of the session key is based on the pseudo-random number. In some instances, the generated number is the session key. The one or more session servers 116A-116N may thereafter use a generated session key to authenticate a session between the one or more session servers 116A-116N and the one or more client devices 118A-118N. For example, a session server 116A may generate a first session key to authenticate a session between session server 116A and client device 118A, and the session server 116B may generate a second session key to authenticate a second session between session server 116B and client device 118B. Alternatively, a single session server 116A may generate the first session key to authenticate the session between session server 116A and client device 118A, and may also generate the second session key to authenticate a session between session server 116A and client device 118B.

In some embodiments, the one or more QRNG chips 110A-110N may be a component of the one or more session servers 116A-116N. For example, the QRNG chip 110A may be a component of the session server 116A, while the QRNG chip 110B may be a component of the session server 116B. In another example (not shown), the QRNG chips 110A and 110B may be components of a single session server, such as the session server 116A.

In some embodiments, the one or more session servers 116A-116N may be located within a server farm. For example, session server 116A and session server 116B may be located within the walls of a building warehouse of a server farm or otherwise within a geographic footprint of the server farm. In some embodiments, the one or more QRNG chips 110A-110N may be located within the server farm. In some embodiments, the one or more QRNG chips 110A-110N may be located outside the server farm. For example, the one or more QRNG chips 110A-110N may be located outside the geographic footprint of the server farm.

The one or more client devices 118A-118N may be embodied by any computing device known in the art. In some embodiments, the one or more client devices 118A-118N may comprise or be coupled to one or more laptop computers, smartphones, netbooks, tablet computers, wearable devices desktop computers, electronic workstations, kiosks, automated transaction machines (ATMs), or the like. The session authentication system 102 may receive information from, and transmit information to, the one or more client devices 118A-118N. For example, the session authentication system 102 may authenticate sessions between the one or more session servers 116A-116N and the one or more client devices 118A-118N. It will be understood that in some embodiments, the client devices 118A-118N need not themselves be client devices, but may be peripheral devices communicatively coupled to client devices.

In one illustrative embodiment, a user may use client device 118A to log in to a website that utilizes one or more cookies. In response to client device 118A logging in to the website, session server 116A may determine to create a session, generate a request for a random number, and transmit the request for the random number to the session authentication system 102. The session authentication system 102 may receive the request for the random number and initiate a process based on any of the various embodiments or combination of embodiments described herein that results in generation, by QRNG chip 110A, of a decoded set of bits. In some instances, the decoded set of bits comprises a plurality of wildcard bits and one or more error bits. The on-chip decoder 114A may then transmit the decoded set of bits to the session server 116A. The session server 116A may receive the decoded set of bits, generate a session key based on the decoded set of bits, and transmit (or, in some instances, perform a quantum key distribution process that includes transmitting) the session key to client device 118A for use in session authentication.

Example Implementing Apparatuses

The example environment described with reference to FIG. 1 may be embodied by one or more computing systems, such as: apparatus 200 shown in FIG. 2A, which represents an example session authentication system 102, a session server 116, or both; apparatus 220 shown in FIG. 2B, which represents an example client device 118; apparatus 240 shown in FIG. 2C, which represents an example QRNG chip 110 comprising, among other components, an example on-chip encoder 112 and an example on-chip decoder 114. As noted previously, it will be appreciated that in some embodiments, one or more of the apparatuses described in connection with FIGS. 2A-2C may be components of another of these apparatuses (as one example, the apparatus 240, representing a QRNG chip 110, may in some embodiments be a component of apparatus 200, which represents an example of the session authentication system 102; as another example, the apparatus 240, representing a QRNG chip 110, may in some embodiments be a component of apparatus 200, which represents an example of a session server 116).

Figure 2A:
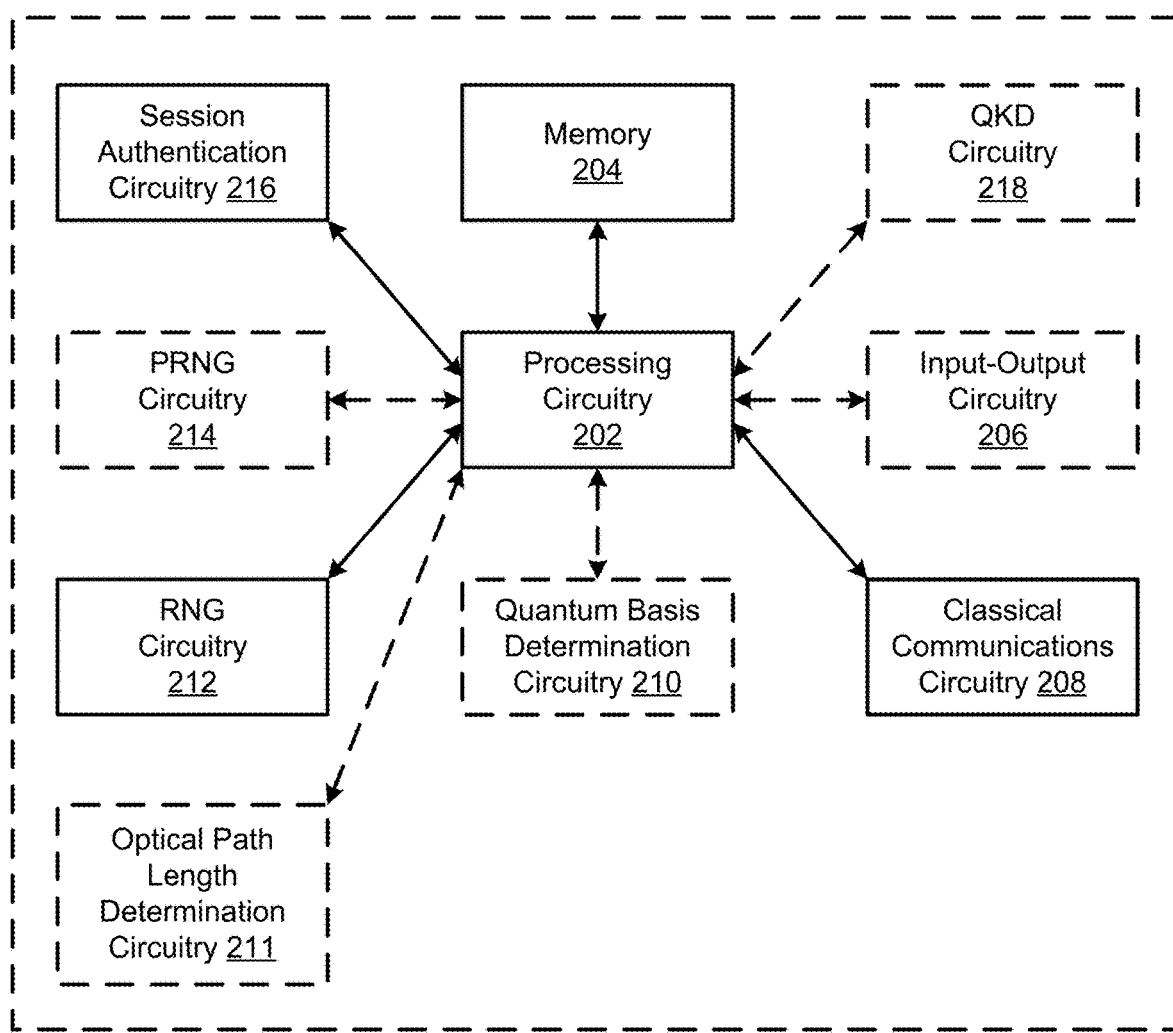
FIGS. 2A, 2B, and 2C illustrate schematic block diagrams of example circuitry that may perform various operations in accordance with some example embodiments described herein.

As illustrated in FIG. 2A, the apparatus 200, representing an example session authentication system 102 (or, in some instances, a session server 116 resident within a session authentication system 102), may include processing circuitry 202, memory 204, input-output circuitry 206, classical communications circuitry 208, quantum basis determination circuitry 210, optical path length determination circuitry 211, random number generation (RNG) circuitry 212, pseudo-random number generation (PRNG) circuitry 214, session authentication circuitry 216, and quantum key distribution (QKD) circuitry 218. The apparatus 200 may be configured to execute various operations described above with respect to FIG. 1 and below with respect to FIGS. 3-7.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data, control signals, electronic information, and, in some instances, encoding and decoding schedules. It will be understood that the memory 204 may be configured to store any electronic information, data, control signals, schedules, links, pointers, databases, tables, maps, embodiments, examples, figures, techniques, processes, operations, techniques, methods, systems, apparatuses, or computer program products described herein, or any combination thereof. The memory 204 may, in this regard, host components such as one or more session authentication system databases 106, described with reference to FIG. 1.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a set of bits, MZI configuration data (e.g., optical path length, optical path difference), a control signal (e.g., a control signal indicative of an instruction to encode or decode qubits according to a particular quantum basis or set of quantum bases; a control signal indicative of an instruction to generate or measure qubits according to a particular optical path length or set of optical path lengths), or a schedule (e.g., a time-dependent quantum encoding schedule, time-dependent quantum decoding schedule, a unit-dependent quantum encoding schedule, or a unit-dependent quantum decoding schedule) provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic content for display by one or more other devices with which one or more users directly interact and classical communications circuitry 208 of the apparatus 200 may be leveraged to transmit the generated electronic content to one or more of those devices.

The classical communications circuitry 208 may be any device or circuitry embodied in either hardware or a combination of hardware and software that is configured to receive and/or transmit data from or to a network and/or any other device, circuitry, or module in communication with the apparatus 200. In this regard, the classical communications circuitry 208 may include, for example, a network interface for enabling communications with a wired or wireless communications network. For example, the classical communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum basis determination circuitry 210 includes hardware components designed or configured to determine, select, choose, or identify: a quantum basis or set of quantum bases for encoding bits; a second quantum basis or set of quantum bases for decoding qubits; or both. In some embodiments, the quantum basis determination circuitry 210 includes hardware components designed or configured to: determine the set of quantum bases without reliance on any other set of quantum bases. In some embodiments, the quantum basis determination circuitry 210 is configured to not transmit the set of quantum bases. In some embodiments, the quantum basis determination circuitry 210 includes hardware components designed or configured to determine the set of quantum bases by: receiving the set of quantum bases from a server device; retrieving the set of quantum bases from a memory; or determining the set of quantum bases using a pseudo-random quantum basis selection technique. In some embodiments, the quantum basis determination circuitry 210 includes hardware components designed or configured to determine the set of quantum bases by: determining a fixed set of quantum bases; receiving the set of quantum bases from a server device; retrieving the set of quantum bases retrieved from a memory; or determining the set of quantum bases using a pseudo-random quantum basis selection technique. It will be understood that the terms "determine," "determining," and "determining," as recited throughout this disclosure, broadly and respectively encompass the terms generate, generating, and generation.

In some embodiments, the quantum basis determination circuitry 210 includes hardware components designed or configured to generate: a first control signal indicative a determined set of quantum bases (or, in some instances, an instruction to encode bits based on the determined set of quantum bases); a second control signal indicative of a determined set of quantum bases (or, in some instances, an instruction to decode qubits based on the determined set of quantum bases); or both. In some embodiments, the quantum basis determination circuitry 210 includes hardware components designed or configured to generate a third control signal indicative of an instruction to encode a set of bits. In some embodiments, the first control signal may comprise one or more links or pointers to the determined set of quantum bases contained in a database of quantum bases stored in memory (e.g., memory 204). In some embodiments, the second control signal may comprise one or more links or pointers to the determined set of quantum bases contained in the database of quantum bases.

In some embodiments, the quantum basis determination circuitry 210 includes hardware components designed or configured to generate: a time-dependent quantum encoding schedule comprising a first plurality of quantum bases respectively corresponding to a first plurality of time periods; a time-dependent quantum decoding schedule comprising a second plurality of quantum bases respectively corresponding to a second plurality of time periods; or both. In some embodiments, the quantum basis determination circuitry 210 includes hardware components designed or configured to generate: a unit-dependent quantum encoding schedule comprising a first plurality of quantum bases respectively corresponding to a first plurality of numbers of bits; a unit-dependent quantum decoding schedule comprising a second plurality of quantum bases respectively corresponding to a second plurality of numbers of bits; or both. The set of quantum bases may be determined by the quantum basis determination circuitry 210 using a pseudo-random quantum basis selection technique, as described previously. Subsequently, the quantum basis determination circuitry 210 may never thereafter transmit information about the selected set of quantum bases, except as necessary for instruction of corresponding on-chip encoder 112 or on-chip decoder 114.

In some embodiments, the quantum basis determination circuitry 210 includes hardware components designed or configured to determine the set of quantum bases based on electronic information indicative of the set of quantum bases (e.g., electronic information indicative of the set of quantum bases received by classical communications circuitry 208 over a communications network). In some instances, the set of quantum bases and the set of quantum bases may be different (e.g., include different quantum bases, different amounts of quantum bases, or both). In some embodiments, the quantum basis determination circuitry 210 includes hardware components designed or configured to determine the set of quantum bases based on the electronic information indicative of the set of quantum bases (e.g., electronic information indicative of the set of quantum bases received by classical communications circuitry 208 over a communications network). In some instances, the set of quantum bases and the set of quantum bases may be different (e.g., include different quantum bases, different amounts of quantum bases, or both).

In some embodiments, the quantum basis determination circuitry 210 includes hardware components designed or configured to generate a time-dependent quantum encoding schedule comprising a first plurality of quantum bases respectively corresponding to a first plurality of time periods. In some instances, the first control signal may comprise the time-dependent quantum encoding schedule, and the set of quantum bases may comprise the first plurality of quantum bases. In some embodiments, the quantum basis determination circuitry 210 includes hardware components designed or configured to generate a time-dependent quantum decoding schedule comprising a second plurality of quantum bases respectively corresponding to a second plurality of time periods. In some instances, the second control signal may comprise the time-dependent quantum decoding schedule, and the set of quantum bases may comprise the second plurality of quantum bases. In some embodiments, the encoding circuitry 224 may be configured to encode the set of bits based on the time-dependent quantum encoding schedule to generate the set of qubits. In some embodiments, the decoding circuitry 226 may configured to decode the set of qubits based on the time-dependent quantum decoding schedule to generate the decoded set of bits.

In some embodiments, the quantum basis determination circuitry 210 includes hardware components designed or configured to generate a unit-dependent quantum encoding schedule comprising a first plurality of quantum bases respectively corresponding to a first plurality of numbers of bits. In some instances, the first control signal may comprise the unit-dependent quantum encoding schedule, and the set of quantum bases may comprise the first plurality of quantum bases. In some embodiments, the quantum basis determination circuitry 210 includes hardware components designed or configured to generate a unit-dependent quantum decoding schedule comprising a second plurality of quantum bases respectively corresponding to a second plurality of numbers of bits. In some instances, the second control signal may comprise the unit-dependent quantum decoding schedule, and the set of quantum bases may comprise the second plurality of quantum bases. In some embodiments, the encoding circuitry 224 may be configured to encode the set of bits based on the unit-dependent quantum encoding schedule to generate the set of qubits. In some embodiments, the decoding circuitry 226 may configured to decode the set of qubits based on the unit-dependent quantum decoding schedule to generate the decoded set of bits.

In some embodiments, the quantum basis determination circuitry 210 includes hardware components designed or configured to determine a set of quantum bases using the pseudo-random quantum basis selection technique. In some embodiments, the pseudo-random quantum basis selection technique may comprise a frequency calculation procedure.

In some embodiments, the quantum basis determination circuitry 210 includes hardware components designed or configured to generate: a unit-dependent photon generation schedule; a unit-dependent decoding schedule comprising a plurality of quantum bases respectively corresponding to a plurality of numbers of bits; or both. In some embodiments, the encoding circuitry 224 may be configured to generate the series of photons based on the unit-dependent photon generation schedule. In some embodiments, the decoding circuitry 226 may configured to decode the series of photons based on the unit-dependent decoding schedule to generate the decoded set of bits.

In some embodiments, the session authentication system 102 may comprise multiple quantum basis determination circuitries 210, such as: one embodied by each QRNG chip 110A-110N; one embodied by each on-chip encoder 112A-112N; one embodied by each on-chip decoder 114A-114N; one that controls optical path length determination for on-chip encoders 112A-112N and another that controls optical path length determination for on-chip decoders 114A-114N; or multiple quantum basis determination circuitries corresponding to any other suitable arrangement.

The hardware components comprising the quantum basis determination circuitry 210 may, for instance, utilize processing circuitry 202 to perform various computing operations and may utilize memory 204 for storage of data or electronic information received or generated by the quantum basis determination circuitry 210. The hardware components may further utilize classical communications circuitry 208 or any other suitable wired or wireless communications path to communicate with a QRNG chip 110, an on-chip encoder 112, an on-chip decoder 114, or any other suitable circuitry or device described herein.

The optical path length determination circuitry 211 includes hardware components designed or configured to determine, select, choose, or identify: a first optical path length or set of optical path lengths for encoding or generating qubits; a second optical path length or set of optical path lengths for decoding or measuring qubits; or both. In some embodiments, the optical path length determination circuitry 211 includes hardware components designed or configured to: determine the first optical path length without reliance on the second optical path length; determine the second optical path length without reliance on the first optical path length; or both. It will be understood that the terms "determine," "determining," and "determining," as recited throughout this disclosure, broadly and respectively encompass the terms generate, generating, and generation.

In some embodiments, the optical path length determination circuitry 211 includes hardware components designed or configured to generate: a first control signal indicative the determined first optical path length (or, in some instances, an instruction to generate qubits based on the determined first optical path length); a second control signal indicative the determined second optical path length (or, in some instances, an instruction to measure qubits based on the determined second optical path length); or both. In some embodiments, the optical path length determination circuitry 211 includes hardware components designed or configured to generate a third control signal indicative of an instruction to generate a set of qubits. In some embodiments, the first control signal may comprise one or more links or pointers to the determined first optical path length contained in a database of optical path lengths stored in memory (e.g., memory 204). In some embodiments, the second control signal may comprise one or more links or pointers to the determined second optical path length contained in the database of optical path lengths.

In some embodiments, the optical path length determination circuitry 211 includes hardware components designed or configured to generate: a time-dependent quantum encoding schedule comprising a first plurality of optical path lengths respectively corresponding to a first plurality of time periods; a time-dependent quantum decoding schedule comprising a second plurality of optical path lengths respectively corresponding to a second plurality of time periods; or both. In some embodiments, the optical path length determination circuitry 211 includes hardware components designed or configured to generate: a unit-dependent quantum encoding schedule comprising a first plurality of optical path lengths respectively corresponding to a first plurality of numbers of qubits; a unit-dependent quantum decoding schedule comprising a second plurality of optical path lengths respectively corresponding to a second plurality of numbers of qubits; or both. The optical path length may be determined by the optical path length determination circuitry 211 using a pseudo-random optical path length selection technique, as described previously. Subsequently, the optical path length determination circuitry 211 may never thereafter transmit information about any determined optical path length, except as necessary for instruction of corresponding on-chip encoder 112 or on-chip decoder 114.

In some embodiments, the optical path length determination circuitry 211 includes hardware components designed or configured to determine the first optical path length based on electronic information indicative of the second optical path length (e.g., electronic information indicative of the second optical path length received by classical communications circuitry 208 over a communications network from the on-chip decoder 114). In some embodiments, the optical path length determination circuitry 211 includes hardware components designed or configured to determine the second optical path length based on the electronic information indicative of the first optical path length (e.g., electronic information indicative of the first optical path length received by classical communications circuitry 208 over a communications network from the on-chip encoder 112). In some instances, the first optical path length and the second optical path length may be different. For example, the optical path difference between the first optical path length and the second optical path length may be a non-zero value. In some instances, the optical path difference between the first optical path length and the second optical path length may be less than a coherence length of a time-bin qubit. For example, the coherence length of a time-bin qubit may be around 100 meters, and the difference between the first optical path length and the second optical path length may be less than about 100 microns.

In some embodiments, the optical path length determination circuitry 211 includes hardware components designed or configured to generate a time-dependent quantum encoding schedule comprising a first plurality of optical path lengths respectively corresponding to a first plurality of time periods. In some instances, the first control signal may comprise the time-dependent quantum encoding schedule. In some embodiments, the optical path length determination circuitry 211 includes hardware components designed or configured to generate a time-dependent quantum decoding schedule comprising a second plurality of optical path lengths respectively corresponding to a second plurality of time periods. In some instances, the second control signal may comprise the time-dependent quantum decoding schedule. In some embodiments, the encoding circuitry 224 may be configured to generate the set of qubits based on the time-dependent quantum encoding schedule. In some embodiments, the decoding circuitry 226 may configured to measure the set of qubits based on the time-dependent quantum decoding schedule to generate the measured set of qubits.

In some embodiments, the optical path length determination circuitry 211 includes hardware components designed or configured to generate a unit-dependent quantum encoding schedule comprising a first plurality of optical path lengths respectively corresponding to a first plurality of numbers of qubits. In some instances, the first control signal may comprise the unit-dependent quantum encoding schedule. In some embodiments, the optical path length determination circuitry 211 includes hardware components designed or configured to generate a unit-dependent quantum decoding schedule comprising a second plurality of optical path lengths respectively corresponding to a second plurality of numbers of qubits. In some instances, the second control signal may comprise the unit-dependent quantum decoding schedule. In some embodiments, the encoding circuitry 224 may be configured to generate a set of qubits based on the unit-dependent quantum encoding schedule. In some embodiments, the decoding circuitry 226 may configured to measure the set of qubits based on the unit-dependent quantum decoding schedule to generate the measured set of qubits.

In some embodiments, the optical path length determination circuitry 211 includes hardware components designed or configured to determine the first optical path length using a pseudo-random optical path length selection technique. In some embodiments, the optical path length determination circuitry 211 includes hardware components designed or configured to determine the second optical path length using the pseudo-random optical path length selection technique. In some embodiments, the pseudo-random optical path length selection technique may comprise a frequency calculation procedure.

In some embodiments, the session authentication system 102 may comprise multiple optical path length determination circuitries 211, such as: one embodied by each QRNG chip 110A-110N; one embodied by each on-chip encoder 112A-112N; one embodied by each on-chip decoder 114A-114N; one that controls optical path length determination for on-chip encoders 112A-112N and another that controls optical path length determination for on-chip decoders 114A-114N; or multiple optical path length determination circuitries corresponding to any other suitable arrangement.

The hardware components comprising the optical path length determination circuitry 211 may, for instance, utilize processing circuitry 202 to perform various computing operations and may utilize memory 204 for storage of data or electronic information received or generated by the optical path length determination circuitry 211. The hardware components may further utilize classical communications circuitry 208 or any other suitable wired or wireless communications path to communicate with a QRNG chip 110, an on-chip encoder 112, an on-chip decoder 114, or any other suitable circuitry or device described herein.

The RNG circuitry 212 includes hardware components designed or configured to generate a number based on a measured set of qubits generated by an on-chip decoder 114. For example, the generated number may be an actual decoded set of bits generated by the on-chip decoder 114, a number that includes the decoded set of bits in its entirety, a number that includes only "error" qubits for which a optical path length used for encoding of a qubit differs from an optical path length used for decoding of the qubit, or any other suitable number. These hardware components may, for instance, utilize processing circuitry 202 to perform various computing operations and may utilize memory 204 for storage of data or electronic information received or generated by the RNG circuitry 212. The hardware components may further utilize classical communications circuitry 208, or any other suitable wired or wireless communications path to communicate with an on-chip decoder 114 or any other suitable circuitry or device described herein.

The PRNG circuitry 214 includes hardware components designed or configured to receive a seed for pseudo-random number generation based on the number generated by the RNG circuitry 212 and then generate a pseudo-random number based on the seed. These hardware components may, for instance, utilize processing circuitry 202 to perform various computing operations and may utilize memory 204 for storage of data or electronic information received or generated by the PRNG circuitry 214.

The session authentication circuitry 216 includes hardware components designed or configured to generate a session ID (e.g., a session key) based on a number generated by the RNG circuitry 212, a pseudo-random number generated by the PRNG circuitry 214, or both. For example, the session authentication circuitry 216 may receive the pseudo-random number from the PRNG circuitry 214 and use the received pseudo-random number as the session key. In another example, the session authentication circuitry 216 may receive the generated number from the RNG circuitry 212 and use the generated number as the session key. In yet another example, the session authentication circuitry 216 may perform a further transformation on a number generated by the RNG circuitry 212 or a pseudo-random number generated by the PRNG circuitry 214 (e.g., a convolution of the number or pseudo-random number with an independent variable, such as an internal clock time measured by the apparatus 200), and thereafter use the result of the further transformation as the session key. In some embodiments, the session authentication circuitry 216 may be further configured to generate the session key by (i) setting the session key equal to a generated number (e.g., a number generated by the RNG circuitry 212 or the PRNG circuitry 214 based on the decoded set of bits), or (ii) using the generated number as a seed in a pseudo-random number generation procedure, wherein an output of the pseudo-random number generation procedure comprises the session key. Following generation of the session key, the session authentication circuitry 216 may transmit the session key to a client device 118 (and in one such embodiment, the session authentication circuitry 216 may cause QKD circuitry 218 to perform quantum key distribution of the session key to securely transmit the session key).

In some embodiments, the session authentication circuitry 216 includes hardware components designed or configured to subsequently authenticate a session between two or more devices. In some instances, the session authentication circuitry 216 may use the generated session key to authenticate a session on behalf of a server device (e.g., a session server 116) and at the request of a client device 118. For example, the session authentication circuitry 216 may use a generated first session key to authenticate a first session on behalf of a session server 116A and at the request of one of client devices 118A-118N. In another example, the session authentication circuitry 216 may use a generated second session key to authenticate a second session between two other devices, such as session server 116B and at the request of another of the client devices 118A-118N. In some instances, the session authentication circuitry 216 may receive a key from the client device 118, and then compare the received key to the generated session key to determine if a match is found. If so, the session authentication circuitry 216 may transmit a communication to the server device comprising a validation of the session key received from the client device 118. If not, then the session authentication circuitry 216 may transmit a communication to the server device indicating a validation failure. The hardware components comprising the session authentication circuitry 216 may, for instance, utilize processing circuitry 202 to perform various computing operations and may utilize memory 204 for storage of data or electronic information received or generated by the session authentication circuitry 216. The hardware components may further utilize classical communications circuitry 208, or any other suitable wired or wireless communications path to communicate with a remote server device or a client device 118, or any other suitable circuitry or device described herein.

The QKD circuitry 218 includes hardware components designed or configured to perform quantum key distribution of a session key generated by the session authentication circuitry 216. These hardware components may, for instance, utilize processing circuitry 202 to perform various computing operations and may utilize memory 204 for storage of data or electronic information received or generated by the QKD circuitry 218. The hardware components may further utilize classical communications circuitry 208, or any other suitable wired or wireless communications path to communicate with a client device 118 to distribute a session ID to the client device 118, or with any other suitable circuitry or device described herein.

Figure 2B:
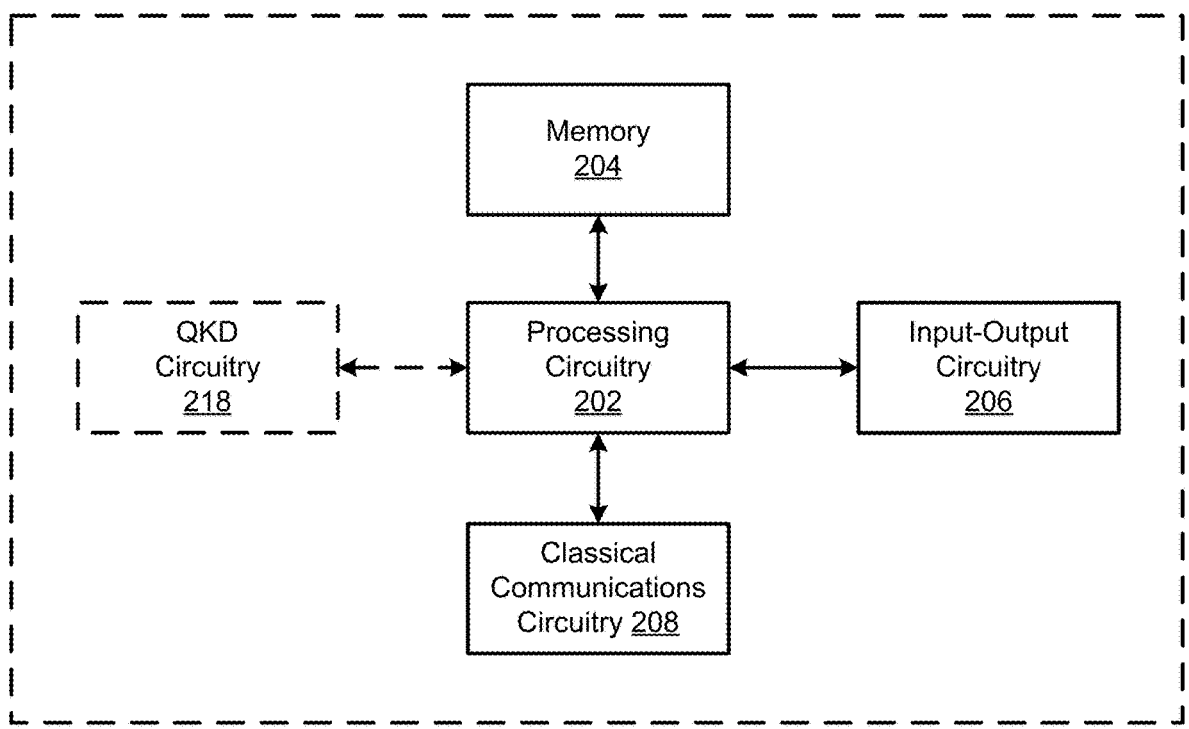

As illustrated in FIG. 2B, an apparatus 220 is shown that represents an example client device 118. The apparatus 220 includes processing circuitry 202, memory 204, input-output circuitry 206, and classical communications circuitry 208, and may optionally include QKD circuitry 218, as described above in connection with FIG. 2A. It will be appreciated that QKD circuitry 218 is an optional component of the apparatus 220 insofar as it is only required if a session ID (e.g., session key) is distributed from the session authentication system 102 to the client device 118 via a QKD procedure (other key distribution techniques may alternatively be used). It will be understood, however, that additional components providing additional functionality may be included in the apparatus 220 without departing from the scope of the present disclosure. The apparatus 220 may be involved in execution of various operations described above with respect to FIG. 1 and below with respect to FIGS. 3-7.

Figure 2C:
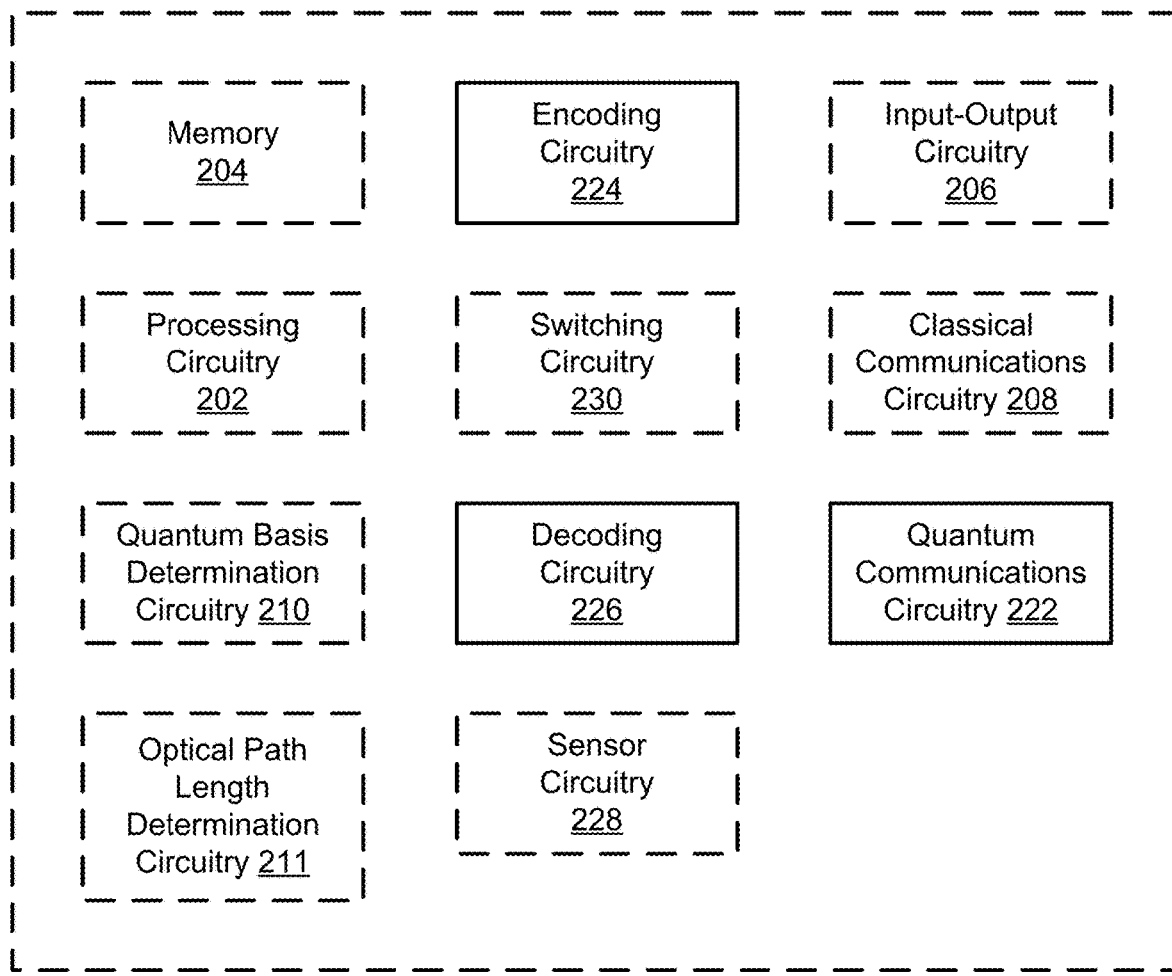

As illustrated in FIG. 2C, an apparatus 240 is shown that represents an example QRNG chip 110. The apparatus 240 includes classical communications circuitry 208, as described above in connection with FIG. 2A. The apparatus 240 additionally includes encoding circuitry 224 to generate a set of qubits and quantum communications circuitry 222 to transmit the set of qubits to decoding circuitry 226 (e.g., from an on-chip encoder 112 to an on-chip decoder 114). The apparatus 240 additionally includes decoding circuitry 226 and sensor circuitry 228 to measure a set of qubits received directly or indirectly (e.g., via switching circuitry 230) from encoding circuitry 224. The apparatus 240 additionally may include switching circuitry 230 to perform the switching operations described herein. In addition, the apparatus 240 may include processing circuitry 202 and a memory 204 to facilitate operation of QRNG chip 110, and may further include: quantum basis determination circuitry 210 in some embodiments where the quantum bases, or sets of quantum bases, selected for encoding and decoding of a given set of qubits is determined by the apparatus 240 and not by a separate session authentication system 102; optical path length determination circuitry 211 in some embodiments where the optical path length, or set of optical path lengths, selected for encoding and decoding of a given set of qubits is determined by the apparatus 240 and not by a separate session authentication system 102; any other suitable circuitry; or any combination thereof.

The quantum communications circuitry 222 may be any device or circuitry embodied in either hardware or a combination of hardware and software that is configured to receive and/or transmit photons, electrons, or both from or to any other device, circuitry, or module in communication with the apparatus 240. In this regard, the quantum communications circuitry 222 may include, for example, an optical communications interface for enabling optical communications over a quantum line.

In some embodiments, the encoding circuitry 224 includes hardware components designed or configured to generate a set of qubits and transmit, directly or indirectly, the set of qubits to the decoding circuitry 226. The encoding circuitry 224 may comprise various optoelectronic components, such as those described previously (including, but not limited to an MZI, a light source, a cloud-based light source, a single photon source, a laser, a modulating circuit, an attenuator, a deflector, or a combination thereof). In some embodiments, the encoding circuitry 224 may include additional hardware components designed or configured to generate qubits based on a time-dependent photon generation schedule. Similarly, the encoding circuitry 224 may include additional hardware components designed or configured to generate qubits based on a unit-dependent photon generation schedule. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., a session authentication system server device 104 or session server 116), or any other suitable circuitry or device described herein.

In some embodiments, the encoding circuitry 224 may include hardware components designed or configured to generate the set of qubits based on a first optical path length and transmit, directly or indirectly, the set of qubits to the decoding circuitry 226. In some embodiments, the set of optical path lengths determined by the optical path length determination circuitry 211 may comprise a second optical path length different from the first optical path length. In some embodiments, the optical path difference between the first optical path length (e.g., corresponding to a first MZI comprised by the encoding circuitry 224) and the second optical path length (e.g., corresponding to a second MZI comprised by the decoding circuitry 226) may be non-zero value.

In some embodiments, the encoding circuitry 224 may include additional or alternate hardware components designed or configured to generate the set of qubits. For example, the encoding circuitry 224 may comprise a laser configured to generate light; an attenuator or deflector optically coupled to the laser and configured to transform the generated light into a series of photons; and an MZI optically coupled to the attenuator or deflector and configured to transform the generated series of photons into the set of qubits. In another example, the encoding circuitry 224 may comprise a single photon source configured to generate a series of photons; and an MZI optically coupled to the single photon source and configured to transform the generated series of photons into the set of qubits. In yet another example, the encoding circuitry 224 may comprise a modulating circuit configured to generate the set of qubits.

In some embodiments, the encoding circuitry 224 may include additional hardware components designed or configured to generate a set of qubits based on a time-dependent quantum encoding schedule comprising a first plurality of optical path length respectively corresponding to a first plurality of time periods. Similarly, the encoding circuitry 224 may include additional hardware components designed or configured to generate a set of qubits based on a unit-dependent quantum encoding schedule comprising a first plurality of optical path length respectively corresponding to a first plurality of numbers of qubits to be encoded.

In some embodiments, the encoding circuitry 224 includes hardware components designed or configured to generate a series of photons and transmit, directly or indirectly, the series of photons to the decoding circuitry 226. The encoding circuitry 224 may comprise various optoelectronic components, such as those described previously (including, but not limited to a light source, a cloud-based light source, a single photon source, a laser, a modulating circuit, an attenuator, a deflector, or a combination thereof). In some embodiments, the encoding circuitry 224 may include additional hardware components designed or configured to generate photons based on a time-dependent photon generation schedule. Similarly, the encoding circuitry 224 may include additional hardware components designed or configured to generate photons based on a unit-dependent photon generation schedule. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., session authentication system server device 104, session server 116), or any other suitable circuitry or device described herein.

In some embodiments, the encoding circuitry 224 may include additional or alternate hardware components designed or configured to generate the series of photons. For example, the encoding circuitry 224 may comprise a laser configured to generate light and an attenuator or deflector, wherein the attenuator or deflector is configured to transform the generated light into the series of photons. In another example, the encoding circuitry 224 may comprise a single photon source configured to generate the series of photons. In yet another example, the encoding circuitry 224 may comprise a modulating circuit configured to generate the series of photons.

In some embodiments, the encoding circuitry 224 includes hardware components designed or configured to generate a set of time-bin qubits and transmit, directly or indirectly, the set of time-bin qubits to the decoding circuitry 226. The encoding circuitry 224 may comprise various optoelectronic components, such as those described previously (including, but not limited to an MZI, a light source, a cloud-based light source, a single photon source, a laser, a modulating circuit, an attenuator, a deflector, or a combination thereof). In some embodiments, the encoding circuitry 224 may include additional hardware components designed or configured to generate time-bin qubits based on a time-dependent photon generation schedule. Similarly, the encoding circuitry 224 may include additional hardware components designed or configured to generate time-bin qubits based on a unit-dependent photon generation schedule. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., session authentication system server device 104, session server 116), or any other suitable circuitry or device described herein.

In some embodiments, the encoding circuitry 224 may include hardware components designed or configured to generate the set of time-bin qubits based on a first optical path length and transmit, directly or indirectly, the set of time-bin qubits to the decoding circuitry 226. In some embodiments, the set of optical path lengths determined by the optical path length determination circuitry 211 may comprise a second optical path length different from the first optical path length. In some embodiments, the optical path difference between the first optical path length (e.g., corresponding to a first MZI comprised by the encoding circuitry 224) and the second optical path length (e.g., corresponding to a second MZI comprised by the decoding circuitry 226) may be non-zero value.

In some embodiments, the encoding circuitry 224 may include additional or alternate hardware components designed or configured to generate the set of time-bin qubits. For example, the encoding circuitry 224 may comprise a laser configured to generate light; an attenuator or deflector optically coupled to the laser and configured to transform the generated light into a series of photons; and an MZI optically coupled to the attenuator or deflector and configured to transform the generated series of photons into the set of time-bin qubits. In another example, the encoding circuitry 224 may comprise a single photon source configured to generate a series of photons; and an MZI optically coupled to the single photon source and configured to transform the generated series of photons into the set of time-bin qubits. In yet another example, the encoding circuitry 224 may comprise a modulating circuit configured to generate the set of time-bin qubits.

In some embodiments, the encoding circuitry 224 may include hardware components designed or configured to generate a set of time-bin qubits based on a time-dependent quantum encoding schedule comprising a first plurality of optical path length respectively corresponding to a first plurality of time periods. Similarly, the encoding circuitry 224 may include additional hardware components designed or configured to generate a set of time-bin qubits based on a unit-dependent quantum encoding schedule comprising a first plurality of optical path length respectively corresponding to a first plurality of numbers of qubits to be encoded.

In some embodiments, the encoding circuitry 224 may include hardware components designed or configured to generate a series of particles and transmit the series of particles through a double-slit structure comprising a first slit and a second slit. In some embodiments, the series of particles may comprise a series of photons. In some embodiments, the series of particles may comprise a series of electrons. In some embodiments, the series of particles may comprise a series of particles that have not been measured. In some embodiments, the series of particles may comprise a series of collimated particles (e.g., a series of particles that are collimated with respect to direction and momentum). In some embodiments, the encoding circuitry 224 may include a laser configured to generate light and an attenuator or deflector coupled to the laser and configured to transform the generated light into the series of particles. In some embodiments, the encoding circuitry 224 may include a single photon source configured to generate the series of particles. In some embodiments, the encoding circuitry 224 may include an electron emission source configured to generate the series of particles. For example, the electron emission source may comprise an electron gun. In another example, the electron emission source may comprise a quantum dot. In some embodiments, the double-slit structure may comprise a barrier, such as a photon barrier or an electron barrier. In some embodiments, a distance between the first slit and the second slit of the double-slit structure may be less than a coherence length of a particle in the series of particles. For example, the coherence length of a particle in the series of particles may be around 100 meters, and the distance between the first slit and the second slit of the double-slit structure may be less than about 100 microns.

The switching circuitry 230 includes hardware components designed or configured to transmit photons, qubits, particles, or a combination thereof received from the encoding circuitry 224 (e.g., an on-chip encoder 112), or from another switching circuitry (e.g., one or more additional switching devices), to one or more decoding circuitries 226 (e.g., one or more of on-chip decoders 114A-114N). For example, the switching circuitry 230 may transmit a first subset of qubits received from the encoding circuitry 224 to a first decoding circuitry 226 (e.g., on-chip decoder 114A). In another example, the switching circuitry 230 may transmit the second subset of qubits received from the encoding circuitry 224 to a second decoding circuitry 226 (e.g., on-chip decoder 114B). These hardware components may utilize quantum communications circuitry 222 to communicate with the encoding circuitry 224 (e.g., an on-chip encoder 112), another switching circuitry (e.g., one or more additional switching devices), decoding circuitry 226 (e.g., one or more of on-chip decoders 114A-114N), or any other suitable circuitry or device described herein.

In some embodiments, the decoding circuitry 226 includes hardware components designed or configured to generate a set of bits by decoding the series of photons received from the encoding circuitry 224 based on a set of quantum bases. The decoding circuitry 226 may comprise various optoelectronic components, such as those described previously (including, but not limited to, a bit manipulator circuit configured to convert the qubit measurement into a stream of classical bits). In some embodiments, the decoding circuitry 226 may use N quantum bases for decoding the photons, where N represents an integer greater than or equal to one. In some embodiments, the decoding circuitry 226 may be configured to not transmit electronic information indicative of the determined set of quantum bases. In some embodiments, the decoding circuitry 226 includes hardware components designed or configured to receive a control signal indicative of an instruction to initiate decoding based on the set of quantum bases and, in response to receiving the control signal, decode the series of photons based on the set of quantum bases.

In some embodiments, the decoding circuitry 226 includes hardware components designed or configured to determine a set of quantum bases to use for measurement, receive a series of photons, and decode the series of photons based on the determined set of quantum bases to generate a decoded set of bits. In some embodiments, the decoding circuitry 226 includes hardware components designed or configured to receive the series of photons while they are not in a well-defined quantum state. The series of photons may comprise a series of non-polarized photons. A non-polarized photon may comprise, for example, a photon whose polarization has not been measured. In some embodiments, the decoding circuitry 226 includes hardware components designed or configured to receive the series of photons over a non-polarization maintaining optical fiber.

In some embodiments, the decoding circuitry 226 may comprise a bit manipulator circuit. The decoding circuitry 226 includes hardware components designed or configured to decode the series of photons by measuring a polarization of the series of photons using the determined set of quantum bases. The bit manipulator circuit includes hardware components designed or configured to convert the measured polarization of the series of photons into the decoded set of bits.

In some embodiments, the decoding circuitry 226 may include additional hardware components designed or configured to decode photons based on a time-dependent decoding schedule comprising a plurality of quantum bases respectively corresponding to a plurality of time periods. As another example, in some embodiments, the decoding circuitry 226 may include additional hardware components designed or configured to decode photons based on a unit-dependent decoding schedule comprising a plurality of quantum bases respectively corresponding to a plurality of numbers of bits to be decoded. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, quantum communications circuitry 222, or any suitable wired or wireless communications path to communicate with a server device (e.g., one or more session authentication system server devices 104), an on-chip encoder 112, or any other suitable circuitry or device described herein. In some instances, the decoding circuitry 226 may decode the series of photons by measuring the series of photons using sensor circuitry 228.

In some embodiments, the decoding circuitry 226 includes hardware components designed or configured to generate a set of qubits by measuring the set of qubits received from an on-chip encoder 112 based on a determined set of optical path lengths. The decoding circuitry 226 may comprise various optoelectronic components, such as those described previously (including, but not limited to, an MZI; a bit manipulator circuit configured to convert the qubit measurement into a stream of classical bits). In some embodiments, the decoding circuitry 226 may use N optical path lengths for decoding the qubits, where N represents an integer greater than or equal to one. In some embodiments, the decoding circuitry 226 may be configured to not transmit electronic information indicative of the determined set of optical path lengths. In some embodiments, the decoding circuitry 226 includes hardware components designed or configured to receive a control signal indicative of an instruction to initiate measurement based on the set of optical path lengths and, in response to receiving the control signal, measure the set of qubits based on the set of optical path lengths.

In some embodiments, the decoding circuitry 226 includes hardware components designed or configured to determine a set of optical path lengths to use for measurement, receive a set of qubits, and measure the set of qubits based on the determined set of optical path lengths to generate a measured set of qubits. In some embodiments, the decoding circuitry 226 includes hardware components designed or configured to receive the set of qubits while they are not in a well-defined quantum state. In some embodiments, the set of qubits may comprise a series of non-polarized photons. A non-polarized photon may comprise, for example, a photon whose polarization has not been measured. In some embodiments, the decoding circuitry 226 includes hardware components designed or configured to receive the set of qubits over a non-polarization maintaining optical fiber.

In some embodiments, the decoding circuitry 226 may comprise a bit manipulator circuit. The decoding circuitry 226 may include hardware components designed or configured to measure the set of qubits by measuring a polarization of the set of qubits using the determined set of optical path lengths. The bit manipulator circuit includes hardware components designed or configured to convert the measured polarization of the set of qubits into the measured set of qubits.

In some embodiments, the decoding circuitry 226 may comprise an MZI. The decoding circuitry 226 may include hardware components designed or configured to control an optical path length of the MZI based on the determined set of optical path lengths; and measure, using the MZI, the set of qubits to generate the measured set of qubits. In some embodiments, the encoding circuitry 224 may comprise a first MZI comprising a first optical path length, and the decoding circuitry 226 may comprise a second MZI comprising a second optical path length different from the first optical path length, wherein the determined set of optical path lengths comprises the second optical path length.

In some embodiments, the decoding circuitry 226 may include additional hardware components designed or configured to measure qubits based on a time-dependent decoding schedule comprising a plurality of optical path lengths respectively corresponding to a plurality of time periods. As another example, in some embodiments, the decoding circuitry 226 may include additional hardware components designed or configured to measure qubits based on a unit-dependent decoding schedule comprising a plurality of optical path lengths respectively corresponding to a plurality of numbers of qubits to be measured. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, quantum communications circuitry 222, or any suitable wired or wireless communications path to communicate with a server device (e.g., one or more session authentication system server devices 104) an on-chip encoder 112, or any other suitable circuitry or device described herein.

In some embodiments, the decoding circuitry 226 includes hardware components designed or configured to detect a first subseries of particles transmitted through the first slit to generate a first detected subseries of particles. The decoding circuitry 226 may further include hardware components designed or configured to detect a second subseries of particles transmitted through the second slit to generate a second detected subseries of particles. For example, the decoding circuitry 226 may comprise a first detector configured to detect the first subseries of particles transmitted through the first slit to generate the first detected subseries of particles. The decoding circuitry 226 may further comprise a second detector configured to detect the second subseries of particles transmitted through the second slit to generate the second detected subseries of particles. In some embodiments, the decoding circuitry 226 may further include hardware components designed or configured to decode the first detected subseries of particles and the second detected subseries of particles to generate a decoded set of bits. For example, the decoding circuitry 226 may comprise a discriminator circuit coupled to the first detector and the second detector and configured to: apply a first discriminator cut-off to the first detected subseries of particles to generate a first discriminated subseries of particles; and apply a second discriminator cut-off to the second detected subseries of particles to generate a second discriminated subseries of particles. The decoding circuitry 226 may further comprise a bit manipulator circuit coupled to the discriminator circuit and configured to convert the first discriminated subseries of particles and the second discriminated subseries of particles into the decoded set of bits.

In some instances, the decoding circuitry 226 may decode, detect, or measure the series of photons, the series of particles, or the set of time-bin qubits by measuring the series of photons, the series of particles, or the set of time-bin qubits using sensor circuitry 228.

The sensor circuitry 228 includes hardware components designed or configured to measure received photons, qubits, particles, or a combination thereof. For example, the sensor circuitry 228 may comprise one or more sensors such as photodetectors, photodiodes, cameras, or any other suitable devices or optoelectronic components. These hardware components may, for instance, utilize processing circuitry 202 to perform various computing operations and may utilize memory 204 for storage of data or electronic information received or generated by the sensor circuitry 228.

The apparatus 240 may be configured to execute various operations described above with respect to FIG. 1 and below with respect to FIGS. 3-7. It will be understood, however, that additional components providing additional functionality may be included in the apparatus 240 without departing from the scope of the present disclosure. Moreover, as noted previously, in some embodiments the QRNG chip 110 comprises a component of a session authentication system 102, and in such embodiments, the components described herein in connection with apparatus 240 shall be understood as comprising components of an apparatus 200 representing a corresponding session authentication system 102 (or a constituent session server 116 thereof).

In some embodiments, the optical path length determination circuitry 211, the encoding circuitry 224, the decoding circuitry 226, or a combination thereof may be configured to control an optical path length of an MZI, such as by increasing or decreasing the temperature, moving an optical component (such as a light source, mirror, beam-splitter, or photodetector), increasing or decreasing the refractive index of a portion of the optical path length, utilizing any other suitable technique for controlling the optical path length, or a combination thereof.

In one illustrative example, the determined set of optical path lengths may comprise one or more determined physical lengths for an optical path. The optical path length determination circuitry 211, the encoding circuitry 224, or both may be configured to control an optical path length of an MZI used to generate a set of time-bin qubits based on the set of optical path lengths by selecting one of the physical lengths in the determined set of optical path lengths and moving (e.g., using a servo motor and a servo motor controller) an optical component (e.g., light source, mirror, beam-splitter, photodetector) such that the physical length of the optical path is substantially equal to the selected physical length. The optical path length determination circuitry 211, the decoding circuitry 226, or both may be configured to control an optical path length of an MZI used to measure a received set of time-bin qubits based on the set of optical path lengths by selecting one of the physical lengths in the determined set of optical path lengths and moving (e.g., using a servo motor and a servo motor controller) an optical component (e.g., light source, mirror, beam-splitter, photodetector) such that the physical length of the optical path is substantially equal to the selected physical length.

In another illustrative example, the determined set of optical path lengths may comprise one or more determined temperatures for an optical path. The optical path length determination circuitry 211, the encoding circuitry 224, or both may be configured to control an optical path length of an MZI used to generate a set of time-bin qubits based on the set of optical path lengths by selecting one of the temperatures in the determined set of optical path lengths and heating or cooling (e.g., using a thermoelectric temperature controller, a heating element, a MEMS heater) the optical path (or a component in thermal communication with the optical path) such that the temperature of the optical path is substantially equal to the selected temperature. The optical path length determination circuitry 211, the decoding circuitry 226, or both may be configured to control an optical path length of an MZI used to measure a received set of time-bin qubits based on the set of optical path lengths by selecting one of the temperatures in the determined set of optical path lengths and heating or cooling (e.g., using a thermoelectric temperature controller, a heating element, a MEMS heater) the optical path (or a component in thermal communication with the optical path) such that the temperature of the optical path is substantially equal to the selected temperature.

In yet another illustrative example, the determined set of optical path lengths may comprise one or more determined media or optical components (e.g., phase shifters, lenses, non-linear crystals, polarizers, wave plates, and other suitable media) for an optical path. The optical path length determination circuitry 211, the encoding circuitry 224, or both may be configured to control an optical path length of an MZI used to generate a set of time-bin qubits based on the set of optical path lengths by selecting one of the media or optical components in the determined set of optical path lengths and inserting or removing (e.g., using a servo motor and a servo motor controller) the selected medium or optical component into or out of the optical path. The optical path length determination circuitry 211, the decoding circuitry 226, or both may be configured to control an optical path length of an MZI used to measure a received set of time-bin qubits based on the set of optical path lengths by selecting one of the media or optical components in the determined set of optical path lengths and inserting or removing (e.g., using a servo motor and a servo motor controller) the selected medium or optical component into or out of the optical path.

In some embodiments, the optical path length determination circuitry 211, the encoding circuitry 224, the decoding circuitry 226, or a combination thereof may be configured to control an optical path length of an MZI by causing the optical path length to change over time based on a time-dependent encoding schedule, a time-dependent decoding schedule, or both. For example, the optical path length determination circuitry 211, the encoding circuitry 224, the decoding circuitry 226, or a combination thereof may be configured to control an optical path length of an MZI over time by moving (e.g., stepping, shaking, vibrating) an optical component between two or more positions defined by the time-dependent encoding schedule, the time-dependent decoding schedule, or both. In another example, the optical path length determination circuitry 211, the encoding circuitry 224, the decoding circuitry 226, or a combination thereof may be configured to control an optical path length of an MZI over time by changing (e.g., by applying a set of pulses to a resistive heating element or a thermoelectric device) the temperature of an optical path over time between two or more temperatures defined by the time-dependent encoding schedule, the time-dependent decoding schedule, or both. In yet another example, the optical path length determination circuitry 211, the encoding circuitry 224, the decoding circuitry 226, or a combination thereof may be configured to control an optical path length of an MZI over time by changing the media (e.g., by moving an optical component into and out of the optical path) of an optical path over time according to the time-dependent encoding schedule, the time-dependent decoding schedule, or both.

In some embodiments, the optical path length determination circuitry 211, the encoding circuitry 224, the decoding circuitry 226, or a combination thereof may be configured to control an optical path length of an MZI by causing the optical path length to change over a number (e.g., a predetermined number, a non-predetermined number) of time-bin qubits based on a unit-dependent encoding schedule, a unit-dependent decoding schedule, or both. For example, the optical path length determination circuitry 211, the encoding circuitry 224, the decoding circuitry 226, or a combination thereof may be configured to control an optical path length of an MZI over a number of time-bin qubits by moving (e.g., stepping, shaking, vibrating) an optical component between two or more positions every N-th time-bin qubit (where N represents an integer greater than or equal to one) defined by the unit-dependent encoding schedule, the unit-dependent decoding schedule, or both. In another example, the optical path length determination circuitry 211, the encoding circuitry 224, the decoding circuitry 226, or a combination thereof may be configured to control an optical path length of an MZI over a number of time-bin qubits by changing (e.g., by applying a set of pulses to a resistive heating element or a thermoelectric device) the temperature of an optical path every M-th time-bin qubit (where M represents an integer greater than or equal to one) between two or more temperatures defined by the unit-dependent encoding schedule, the unit-dependent decoding schedule, or both. In yet another example, the optical path length determination circuitry 211, the encoding circuitry 224, the decoding circuitry 226, or a combination thereof may be configured to control an optical path length of an MZI over time by changing the media (e.g., by moving an optical component into and out of the optical path) of an optical path every L-th time-bin qubit (where L represents an integer greater than or equal to one) according to the unit-dependent encoding schedule, the unit-dependent decoding schedule, or both.

Although some of these components of apparatuses 200, 220, and 240 are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, quantum communications interface, optoelectronic components, storage medium, or the like to perform their associated functions, such that duplicate hardware is not required for each set of circuitry. It should also be appreciated that, in some embodiments, one or more of these components may include a separate processor, specially configured field programmable gate array (FPGA), application specific interface circuit (ASIC), or cloud utility to perform its corresponding functions as described herein.

The use of the term "circuitry" as used herein with respect to components of apparatuses 200, 220, and 240 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, quantum communications interfaces, input-output devices, optoelectronic components, and other components. In some embodiments, other elements of apparatuses 200, 220, and 240 may provide or supplement the functionality of particular circuitry. For example, the processing circuitry 202 may provide processing functionality, memory 204 may provide storage functionality, and classical communications circuitry 208 may provide network interface functionality, among other features.

In some embodiments, various components of one or more of the apparatuses 200, 220, or 240 may be hosted remotely (e.g., by one or more cloud servers) and thus need not physically reside on the corresponding apparatus 200, 220, or 240. Thus, some or all of the functionality described herein may be provided by third party circuitry. For example, a given apparatus 200, 220, or 240 may access one or more third party circuitries via any sort of networked connection that facilitates transmission of data and electronic information between the apparatus 200, 220, or 240 and the third party circuitries. In turn, that apparatus 200, 220, or 240 may be in remote communication with one or more of the other components describe above as comprising the apparatus 200, 220, or 240.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Polarization-Based QRNG Chip

Figure 3A:
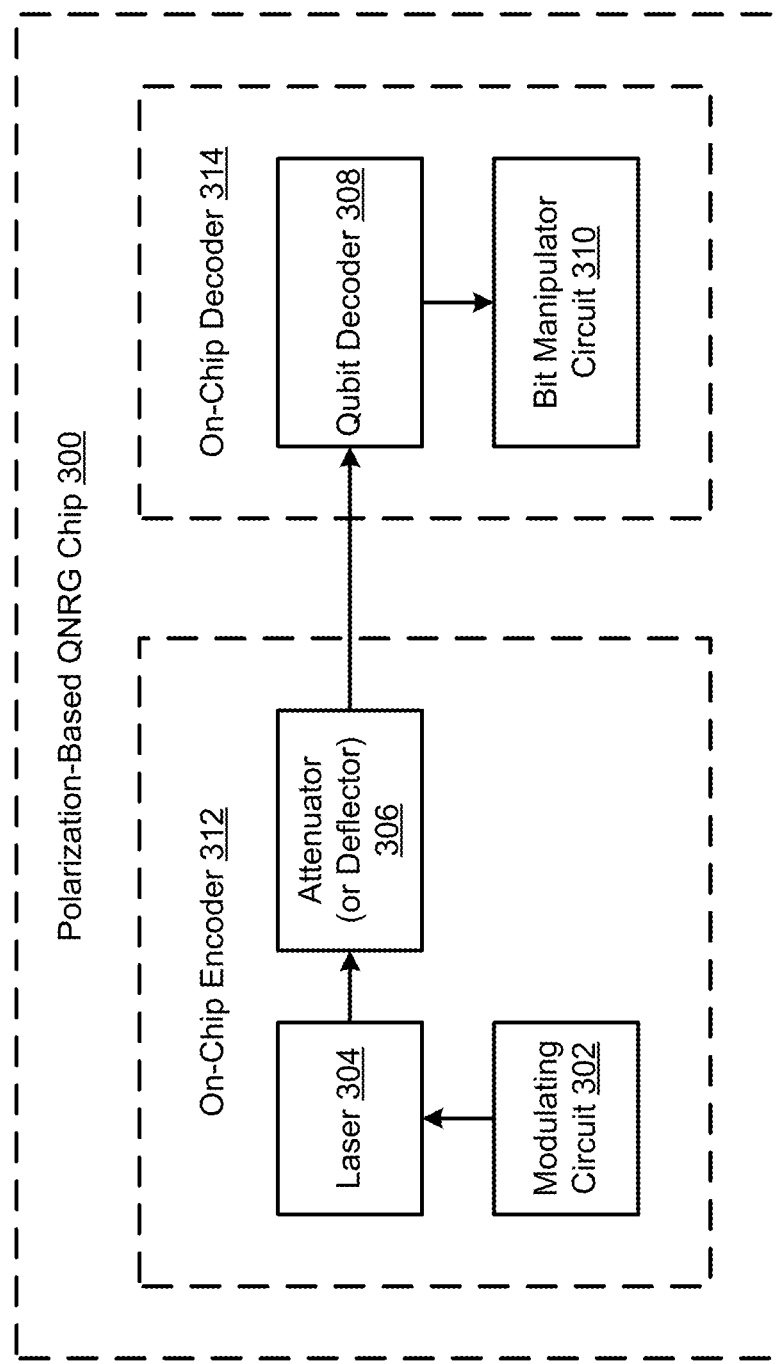
FIGS. 3A and 3B illustrate schematic block diagrams of example polarization-based QRNG chips that may be involved in some example embodiments described herein.
Figure 3B:
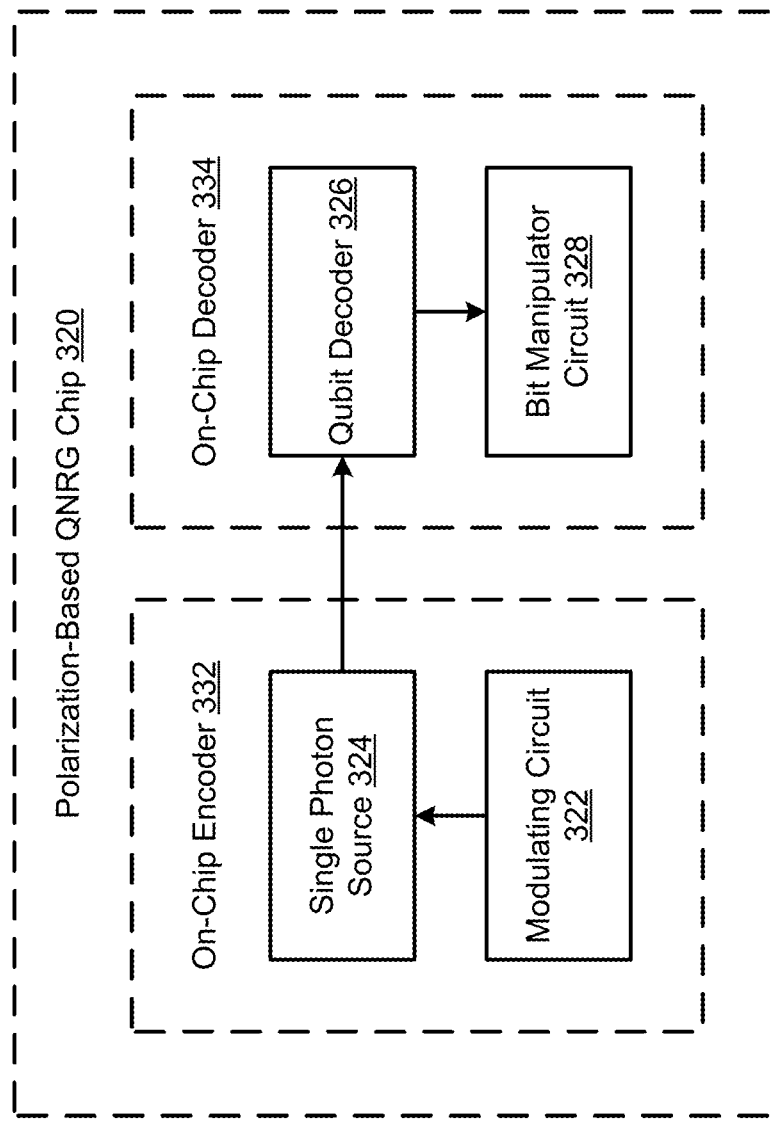

Turning to FIGS. 3A-3B, the polarization-based QRNG chip 300 or 320 is configured to decode a set of quantum states as quantum bits (qubits) using arbitrary quantum bases in order to generate a decoded set of bits that may be used by the session authentication system 102, session server 116, or both to generate a random number that may be further used to generate a session key or a random seed (e.g., a set of bits that is randomized due to quantum effects such as the principle of quantum uncertainty) for session key generation or seed for a pseudo-random number generation used to establish a secure session. For example, when the polarization-based QRNG chip 300 or 320 encodes (e.g., generates) a non-polarized photon and then decodes (e.g., measures) that photon using a quantum basis, the nature of quantum uncertainty and the indeterminacy of quantum states establishes that decoding the photon will generate a bit that has some randomness. This randomness can then be used to prevent the reproduction of session keys by malicious attackers.

The polarization-based QRNG chip 300 or 320 thus provides improved session authentication techniques by decoding quantum bits (qubits) using arbitrary sets of quantum bases in order to randomly generate a number that may be used to generate a session key or that may comprise a random seed for pseudo-random number generation used to establish a secure session. In one illustrative example, the polarization-based QRNG chip 300 or 320 provides for sending pulses of photos, by a light source and decoding those photons using a quantum basis or a set of quantum bases to generate a decoded set of bits. The quantum bases may comprise, for instance, the horizontal photon polarization state |0> and the vertical photon polarization state |1>. The quantum bases may alternatively or in addition comprise the left circular photon polarization state |L> and the right circular photon polarization state |R>, which are linear combinations of the vertical and horizontal photon polarization states |0> and |1>. Subsequently, the present disclosure provides for transmitting photon pulses by a light source to a qubit decoder (e.g., an optoelectronic device such as a polarized light demodulator (PLD)). In some instances, the present disclosure provides for generating, by the qubit decoder, a sequence of random bits by decoding (e.g., measuring) the received sequence of qubits using arbitrary quantum bases, which will thus introduce random errors in the decoded set of bits based on quantum uncertainty.

In some embodiments, the operations of the polarization-based QRNG chip 300 or 320 comprise generating and transmitting single photon pulses to a plurality of on-chip decoders wherein (i) the quantum bases used for encoding and decoding are different or (ii) the photons are not in a particular polarization state and an arbitrary or determined set of quantum bases is used for decoding; thereby generating a bit stream that is inherently random. The bit stream may be used as a session key or otherwise used for session authentication.

As shown in FIG. 3A, the polarization-based QRNG chip 300 may comprise an on-chip encoder 312 and an on-chip decoder 314. The on-chip encoder 312 may comprise a modulating circuit 302, a laser 304, and an attenuator (or deflector) 306. In some embodiments, laser 304 may be an edge-emitting laser. In other embodiments, laser 304 may be a fiberoptic laser with a polarizing component, a VCSEL, a PLM, or any other suitable laser or device. In some embodiments, modulating circuit 302 may be configured to modulate the laser 304, and the laser 304 may be configured to produce pulses of photons. The laser 304 may be coupled to an attenuator (or deflector) 306 to reduce the intensity of the photon pulses to about one photon per pulse and thereby transmit single photons to the on-chip decoder 314. In some embodiments, the laser 304 may generate a series of photons in the infrared or near-infrared range (e.g., 1550 nanometers (nm), 980 nm, 900 nm).

The on-chip decoder 314 may comprise a qubit decoder 308 and a bit manipulator circuit 310. The qubit decoder 308 may comprise, or be, a polarimeter configured to measure the polarization of photons in a determined set of quantum bases or, in some instances, an arbitrary quantum basis. For instance, in the case of a completely unpolarized state, qubit decoder 308 may set the qubits to one and zero with a probability of fifty percent. A bit manipulator circuit 310 comprised by, or communicatively coupled to, the qubit decoder 308 may convert the qubit measurement into a stream of classical bits.

In another example embodiment, as shown in FIG. 3B, the polarization-based QRNG chip 320 may comprise an on-chip encoder 332 and an on-chip decoder 334. The on-chip encoder 332 may comprise a modulating circuit 322 and a single photon source 324. The on-chip decoder 334 may comprise a qubit decoder 326 (e.g., a polarimeter) and a bit manipulator circuit 328. In some embodiments, modulating circuit 322 may be configured to modulate the single photon source 324, and the single photon source 324 may be configured to produce pulses of single photons. In this example embodiment, the single photon source 324 performs substantially the same function as the combination of laser 304 and attenuator (or deflector) 306 of the embodiment shown in FIG. 3A. Accordingly, the combination of the laser 304 with the attenuator (or deflector) 306 may be replaced by a single photon source 324 and thus the single photon polarization state may be measured at the qubit decoder 326.

In some embodiments, the on-chip encoder 312 or 332 may be configured to generate a series of photons (e.g., a stream of photons, one or more photon pulses, a sequence of single photons), where each photon is not polarized. The on-chip encoder 312 or 332 may be further configured to transmit the series of photons to the on-chip decoder 314 or 334 over an optical or quantum line. The on-chip decoder 314 or 334 is communicatively coupled to the on-chip encoder 312 or 332 by the optical or quantum line and is configured to receive a series of photons from the on-chip encoder 312 or 332 over the optical or quantum line. In some embodiments, the on-chip decoder 314 or 334 may comprise a bit manipulator circuit 310 or 328 configured to convert the qubit measurement into a stream of classical bits. The on-chip decoder 314 or 334 may be further configured to determine a set of quantum bases and decode the received series of photons based on the determined set of quantum bases to generate a set of bits. The set of bits will thus include a random component. In some embodiments, the on-chip decoder 314 or 334 is configured to not transmit the set of quantum bases. In some embodiments, the on-chip decoder 314 or 334 may receive the pulses of single photons and use any (e.g., arbitrary) set of quantum bases to measure the polarization of the photon pulses and thereby generate a decoded set of bits. Since the received photons are not polarized, the polarization measurement at the on-chip decoder 314 or 334 results in completely random decoded bits even if the on-chip decoder 314 or 334 uses only one quantum basis to decode all the photons.

In some embodiments, the polarization-based QRNG chip 300 or 320 may be configured to receive (e.g., from session authentication system 102) or generate a photonic control signal indicative of an instruction to generate a series of photons and transmit the photonic control signal to the on-chip encoder 312 or 332. The on-chip encoder 312 or 332 may be configured to receive the photonic control signal and, in response to receipt of the photonic control signal, generate the series of photons. The on-chip encoder 312 or 332 may store the photonic control signal in memory. In some instances, the on-chip encoder 312 or 332 may generate the series of photons on the fly (e.g., in response to processing the photonic control signal). In some embodiments, the on-chip encoder 312 or 332 may be configured to transmit the series of photons over optical line to on-chip decoder 314 or 334. In some embodiments, the on-chip decoder 314 or 334 may be configured to determine a set of quantum bases. In some embodiments, the on-chip decoder 314 or 334 may be configured to receive the control signal indicative of the set of quantum bases. In some embodiments, the on-chip decoder 314 or 334 may be configured to receive the series of photons over an optical or quantum line and decode the series of photons based on the set of quantum bases to generate a decoded set of bits. In some embodiments, the on-chip decoder 314 or 334 may be configured to transmit the decoded set of bits to a session server (e.g., session server 116).

In some instances, the on-chip decoder 314 or 334 may retrieve the set of quantum bases from on-chip memory in response to receiving the series of photons. In other instances, the on-chip decoder 314 or 334 may receive the set of quantum bases in response to processing one or more links or pointers to a set of quantum bases contained in a database of quantum bases, a table of quantum bases, or a map of quantum bases stored in remote memory, or in a separate database of quantum bases, table of quantum bases, or map of quantum bases stored in remote memory (e.g., one or more session authentication system databases 106). The on-chip decoder 314 or 334 may retrieve the set of quantum bases from the remote memory based on the one or more links or pointers. In still other instances, the on-chip decoder 314 or 334 may determine the set of quantum bases on the fly (e.g., in response to receiving the series of photons; in response to processing a control signal). In still other instances, the on-chip decoder 314 or 334 may receive the set of quantum bases from a third-party device.

In some embodiments, the on-chip decoder 314 or 334 may be configured to decode various photons of the series of photons based on multiple quantum bases, such as a first quantum basis, a second quantum basis different from the first quantum basis, and in some embodiments, additional quantum bases different from the first or the second quantum bases. For instance, a first quantum basis used for decoding a first photon of the series of photons may comprise a first pair of orthogonal photonic polarization states selected at least partially from the group consisting of a pair of rectilinear photonic polarization states, a pair of diagonal photonic polarization states, and a pair of circular photonic polarization states; and a second quantum basis used for decoding a second photon of the series of photons may comprise a second pair of orthogonal photonic polarization states selected at least partially from the group but that are different from the first pair of orthogonal photonic polarization states. In some instances, a third quantum basis used for decoding a third photon of the series of photons may be the same as, or different from, the first quantum basis. For example, the first quantum basis may comprise a first pair of orthogonal photonic polarization states selected at least partially from the group consisting of a pair of rectilinear photonic polarization states, a pair of diagonal photonic polarization states, and a pair of circular photonic polarization states; the second quantum basis may comprise a second pair of orthogonal photonic polarization states different from the first pair of orthogonal photonic polarization states and selected from the same group; and the third quantum basis may comprise a third pair of orthogonal photonic polarization states different from the second pair of orthogonal photonic polarization states and selected from the same group. In one illustrative example, the first quantum basis may be the rectilinear basis, the second quantum basis may be the diagonal basis, and the third quantum basis may be the rectilinear basis or the circular basis. In another illustrative example, the first quantum basis may be the rectilinear basis, the second quantum basis may be the circular basis, and the third quantum basis may be the rectilinear basis or the diagonal basis. In yet another illustrative example, the first quantum basis may be the diagonal basis, the second quantum basis may be the rectilinear basis, and the third quantum basis may be the diagonal basis or the circular basis. In yet another illustrative example, the first quantum basis may be the diagonal basis, the second quantum basis may be the circular basis, and the third quantum basis may be the rectilinear basis or the diagonal basis. In yet another illustrative example, the first quantum basis may be the circular basis, the second quantum basis may be the rectilinear basis, and the third quantum basis may be the diagonal basis or the circular basis. In yet another illustrative example, the first quantum basis may be the circular basis, the second quantum basis may be the diagonal basis, and the third quantum basis may be the rectilinear basis or the circular basis.

In some embodiments, the on-chip decoder 314 or 334 is configured to transmit (e.g., to the session server 116, the session authentication system 102, or both) the set of bits generated by decoding the received series of photons. This transmission may occur either via one or more communications networks 108 or via a non-network communication path (although in embodiments where the on-chip decoder 314 or 334 comprises a component of the session authentication system 102, internal conveyance of the set of bits may occur via an internal system bus (not shown for sake of brevity), or may not need to occur at all). In some embodiments, the decoded set of bits cannot reliably be recreated due to the randomization introduced by the quantum effect triggered from use of the set of quantum bases during decoding of a series of non-polarized photons. In some embodiments, the on-chip decoder 314 or 334 may be configured to not transmit any electronic information indicative of any of the set of quantum bases to any other device.

As a foundation for some embodiments, the polarization-based QRNG chip 300 or 320 may provide for determining, selecting, choosing, or identifying the set of quantum bases for decoding the series of photons. As a foundation for some embodiments, the polarization-based QRNG chip 300 or 320 may provide for generating a control signal indicative of an instruction to decode photons based on a set of quantum bases that has been selected, chosen, determined, or identified by the polarization-based QRNG chip 300 or 320, the session authentication system 102, another QRNG chip, or a combination thereof.

In some embodiments, the polarization-based QRNG chip 300 or 320 may be configured to generate a time-dependent photon generation schedule comprising a plurality of subseries of photons respectively corresponding to a plurality of time periods. In some instances, the polarization-based QRNG chip 300 or 320 may be configured to transmit the time-dependent photon generation schedule to the on-chip encoder 312 or 332. The on-chip encoder 312 or 332 may be configured to receive the time-dependent photon generation schedule and generate a series of photons based on the time-dependent photon generation schedule. For example, an example time-dependent photon generation schedule may comprise electronic information indicative of instructions to generate a first subseries of photons during a first time period (e.g., a first 10 nanoseconds), a second subseries of photons during a second time period (e.g., the next 20 nanoseconds), a third subseries of photons during a third time period (e.g., the next 50 nanoseconds), and a fourth subseries of photons during a fourth time period (e.g., the next 20 nanoseconds), after which the time-dependent photon generation schedule may repeat.

In some embodiments, the polarization-based QRNG chip 300 or 320 may be configured to generate a time-dependent decoding schedule comprising a plurality of quantum bases respectively corresponding to a plurality of time periods. In some instances, the polarization-based QRNG chip 300 or 320 may be configured to transmit the time-dependent decoding schedule to the on-chip decoder 314 or 334. The on-chip decoder 314 or 334 may be configured to receive the time-dependent decoding schedule and decode photons based on the time-dependent decoding schedule. For example, an example time-dependent decoding schedule may comprise electronic information indicative of instructions to decode photons based on a diagonal basis during a first time period (e.g., a first 5 nanoseconds), a rectilinear basis during a second time period (e.g., the next 30 nanoseconds), and a circular basis during a third time period (e.g., the next 10 nanoseconds), after which the time-dependent decoding schedule may repeat.

It will be appreciated that other patterns of quantum basis selection may be utilized as well. In some embodiments, the polarization-based QRNG chip 300 or 320 may be configured to generate a unit-dependent photon generation schedule. In some instances, the polarization-based QRNG chip 300 or 320 may be configured to transmit the unit-dependent photon generation schedule to the on-chip encoder 312 or 332. The on-chip encoder 312 or 332 may be configured to receive the unit-dependent photon generation schedule and generate a series of photons based on the unit-dependent photon generation schedule. For example, an example unit-dependent photon generation schedule may comprise electronic information indicative of instructions to generate a first subseries of photons for a first number of photons (e.g., a first 2 photons), a second subseries of photons for a second number of photons (e.g., the next 5 photons), a third subseries of photons for a third number of photons (e.g., the next 3 photons), and a fourth subseries of photons during for a fourth number of photons (e.g., the next 2 photons), after which the unit-dependent photon generation schedule may repeat.

In some embodiments, the polarization-based QRNG chip 300 or 320 may be configured to generate a unit-dependent decoding schedule. In some instances, the polarization-based QRNG chip 300 or 320 may be further configured to transmit the unit-dependent decoding schedule to the on-chip decoder 314 or 334. The on-chip decoder 314 or 334 may be configured to receive the unit-dependent decoding schedule and decode a received series of photons based on the unit-dependent decoding schedule to generate a set of bits. For example, an example unit-dependent decoding schedule may comprise electronic information indicative of instructions to decode photons based on a diagonal basis for a first number of bits (e.g., a first 2 bits), a rectilinear basis for a second number of bits (e.g., the next 4 bits), and a circular basis during for a third number of bits (e.g., the next 2 bits), after which the unit-dependent decoding schedule may repeat. Other encoding and decoding patterns may be utilized as well without departing from the scope of the present disclosure.

In some embodiments, the polarization-based QRNG chip 300 or 320 may be configured to determine a set of quantum bases for use by the on-chip decoder 314 or 334 using a pseudo-random quantum basis selection technique. For example, the on-chip decoder 314 or 334 may itself select a set of quantum bases for use and may utilize that selected set of quantum bases without ever transmitting information about the selected set of quantum bases to any other device. In another example, the polarization-based QRNG chip 300 or 320 may determine a set of quantum bases for use by the on-chip decoder 314 or 334 using a pseudo-random quantum basis selection technique, and the polarization-based QRNG chip 300 or 320 may never thereafter transmit information about the selected set of quantum bases.

By way of example, in some embodiments, the selection of an appropriate set of quantum bases may utilize a frequency calculation procedure in which a selection frequency for each quantum basis may be monitored such that the likelihood that an unselected quantum basis is selected during subsequent selections is increased until an unselected quantum basis is selected. Said differently, in an instance in which a first quantum basis is initially selected, the remaining quantum bases may be weighted such that selection of these quantum bases on subsequent selections operations is more likely as compared to the first quantum basis. Once these remaining quantum bases are selected in the future, however, their corresponding weighting may decrease relative to still other unselected quantum bases. To duplicate this pseudo-random quantum basis selection technique, an intruder would need to have insight into multiple different iterations of the pseudo-random number generation technique, and even then would need to deduce the weighting scheme. While a frequency calculation procedure is outlined above for selection of a set of quantum bases for the on-chip encoder 312 or 332 or the on-chip decoder 314 or 334, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the set of quantum bases for the on-chip decoder 314 or 334 without departing from the scope of the disclosure.

In some embodiments, the on-chip decoder 314 or 334 may be configured to receive a series of photons while they are not in a well-defined quantum state. The series of photons may comprise a series of non-polarized photons. A non-polarized photon may comprise, for example, a photon whose polarization has not been measured. In some embodiments, the on-chip decoder 314 or 334 may be configured to receive the series of photons over a non-polarization maintaining optical fiber. So long as the photon pulses from the light source (e.g., on-chip encoder 312 or 332) are not in a well-defined quantum state when they arrive at the on-chip decoder 314 or 334, the decoded qubits will have inherent randomness regardless of the quantum basis with which they are measured. For instance, the use of a non-polarization maintaining optical line may ensure that polarization states are not maintained even the photons coming out the light source have a certain degree of polarization. In addition, another benefit of the present embodiments is the fact that the light source need not be a polarized light source, and any other optical components such as repeaters or switches need not be polarization maintaining components.

MZI-Based QRNG Chip

Figure 4A:
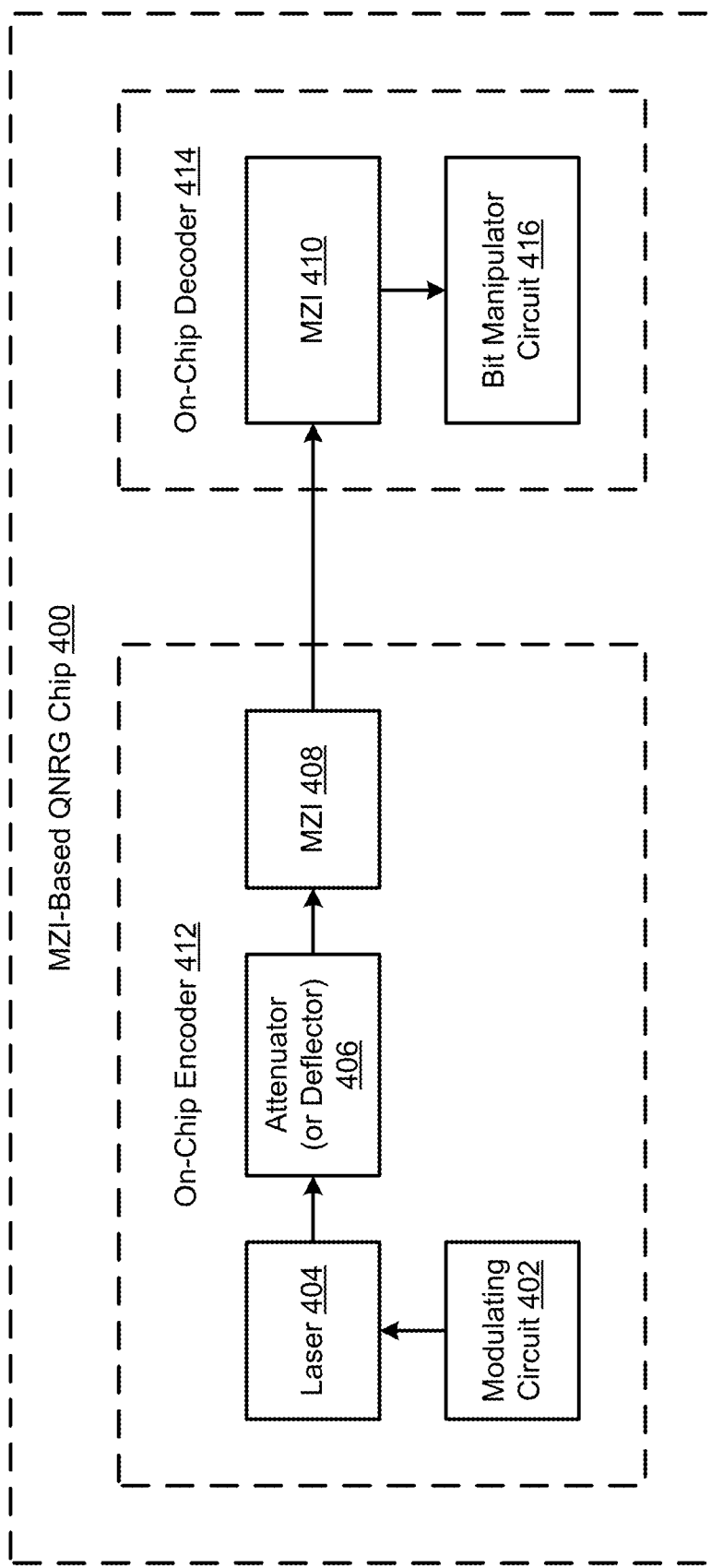
FIGS. 4A, 4B, and 4C illustrate schematic block diagrams of example MZI-based QRNG chips that may be involved in some example embodiments described herein.
Figure 4B:
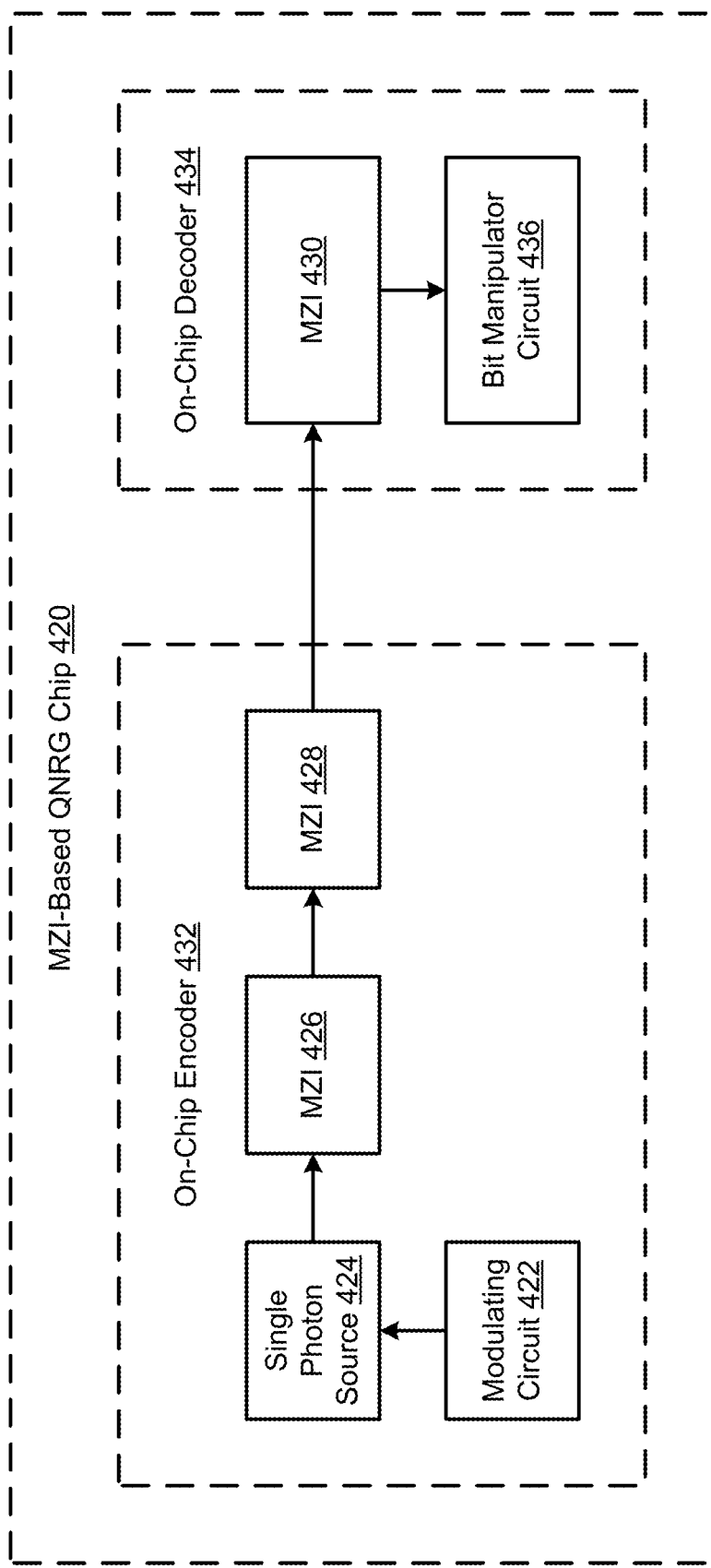
Figure 4C:
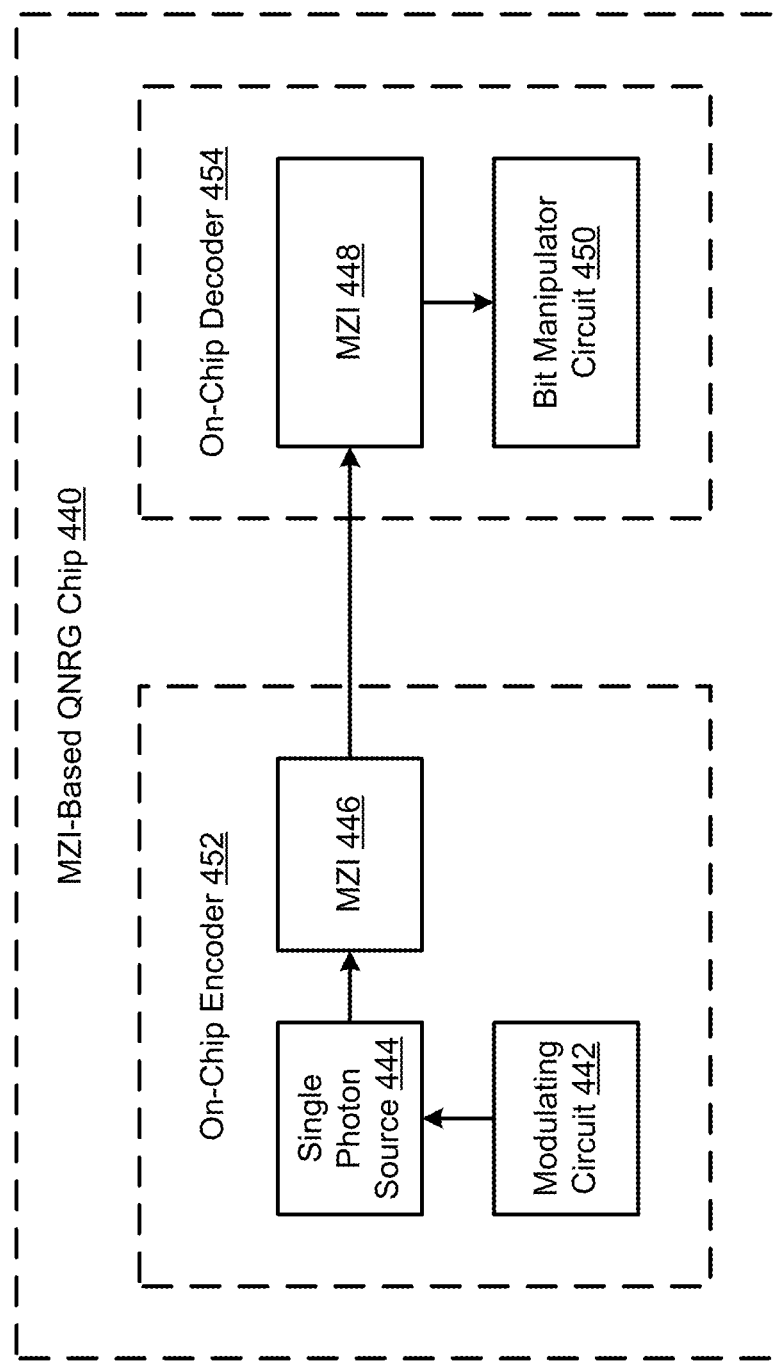

Turning to FIGS. 4A-4C, the QRNG chip 400, the QRNG chip 420, and the QRNG chip 440 are configured to encode and decode a set of time-bin qubits (e.g., qubits) using Mach-Zehnder interferometry in order to generate a random number used to generate a session key or a random seed (e.g., a set of qubits that is randomized due to quantum effects such as the principle of quantum uncertainty) for pseudo-random number generation used to establish a secure session. A quantum bit or a qubit may be represented by any two-state quantum attribute. When a qubit is encoded into a time-bin qubit using a first MZI and measured using a second MZI having the same characteristics, the original time-bin qubit is recreated. Generation of time-bin qubits may be accomplished by determination and temperature-stabilization of the optical path lengths of the two optical paths. For example, the state |0> may be assigned to the first arriving wave and the state |1> to the later arriving wave such that the time-bin qubit encoder described herein may encode qubits based on the two states.

However, the nature of quantum uncertainty and the indeterminacy of quantum states establishes that decoding the time-bin qubit using a second MZI with characteristics that are different from the first MZI will generate a qubit that has some probability of being different than the original qubit. As such, by ensuring that different MZIs are used when encoding and decoding at least some of the set of time-bin qubits in a transmission, the session authentication system disclosed herein introduces random errors in the measured time-bin qubits based on quantum uncertainty and the indeterminacy of these quantum states. These random errors can then prevent the reproduction of session keys by malicious attackers.

The embodiments shown in FIGS. 4A-4C thus provide improved session authentication techniques by encoding and decoding qubits using time-bin encoding and decoding in order to randomly generate a number that may be used to generate a session key or that may comprise a random seed for pseudo-random number generation used to establish a secure session. In one illustrative example, the embodiments shown in FIGS. 4A-4C provide for encoding, by a single-photon laser device in conjunction with a first MZI, a sequence of bits that is then used to generate a set of time-bin qubits. Using decoherency of the time-bin quantum states, the decoded time-bin qubits have inherent randomness. In some instances, the embodiments shown in FIGS. 4A-4C provide for generating, by the qubit decoder (e.g., an MZI having different specifications than the MZI used to encode the time-bin qubits), a sequence of random bits will thus not match the encoded sequence of time-bin qubits, and which will thus introduce random errors in the decoded set of bits based on quantum uncertainty.

According to the quantum indeterminacy of the states, each decoded time-bin qubit has a probability (e.g., a fifty percent chance) of measuring the time-bin qubit that was originally encoded. As a result, presuming that at least a portion of the time-bin qubit pattern generated by the time-bin qubit decoder is decoded with decoherency, the resulting set of time-bin qubits is inherently random and may be used as a random number for any purpose (e.g., as a session ID or a seed for PRNG). The random number cannot be reproduced by any perpetrator due to the probabilistic effects of quantum uncertainty, even if the perpetrator knows the original time-bin qubits that were transmitted.

In some embodiments, the MZIs included in the on-chip encoder 412, 432, or 452 (e.g., a time-bin qubit encoder) and the on-chip decoder 414, 434, or 454 (e.g., a time-bin qubit decoder) may be asymmetrical MZIs and decoherency may be introduced through means other than differences in optical path length or device characteristics, such as lack of temperature control or temperature gradients. In traditional QKD systems, the optical path from the encoder to the decoder must be stable and, in many cases, temperature controlled to prevent quantum decoherence of photon pulses. In contrast to these traditional systems, the embodiments shown in FIGS. 4A-4C provide that the optical path from the encoder MZI (e.g., the first MZI included in the time-bin qubit encoder) to the decoder MZI (e.g., the second MZI included in the time-bin qubit decoder) may be unstable and not temperature controlled to enhance the quantum decoherence of photon pulses. These embodiments use decoherency as an advantage to improve randomness. Due to quantum decoherency, the qubit will be measured randomly at the decoder MZI, and thus, one will generate a different binary number. Even identical qubit sequences measured twice will result in the generation of two different binary numbers which are random in nature.

In some embodiments, the embodiments shown in FIGS. 4A-4C provide for time-bin encoding using Mach-Zehnder interferometry to separate (e.g., slightly) two photons such that their times of flight until the time of arrival at the destination are, and remain, different. By scrambling the time of flight or the time of measurement, ambiguity may be introduced in the photon arrival times and provide for generation of a random number based on a random measurement of "1"s and "0"s. The random number may be used for session key generation and thereby secure a client-server session which could not be broken by any guessing algorithm or method due to true indeterminacy of quantum states. In some embodiments, the system may be placed on a monolithic chip.

In some embodiments, the embodiments shown in FIGS. 4A-4C provide a system for session authentication using quantum line switching, the system comprising: encoding circuitry configured to generate a first set of time-bin qubits and transmit the set of time-bin qubits over a quantum line; decoding circuitry configured to receive the set of time-bin qubits and time-bin decode, based on a decoherent decoding apparatus or line of transfer, the set of time-bin qubits to generate a set of random bits; and session authentication circuitry configured to generate a session key based on the set of random bits. The decoherency could be caused by asymmetric MZIs (e.g., an MZI encoder and an MZI decoder having decoherent path lengths).

There are many advantages of the embodiments shown in FIGS. 4A-4C. For instance, the session key or the seed generated in this way is inherently random and is unattainable to any perpetrator due to quantum uncertainty. The traditional coherence length issue obviated by the random number generation techniques disclosed herein because decoherence does not harm, and actually helps, the process of randomizing the decoded qubits. Further, temperature control for path stabilization is not needed.

As shown in FIG. 4A, the MZI-based QRNG chip 400 may comprise an on-chip encoder 412 (e.g., a time-bin qubit encoder) and an on-chip decoder 414 (e.g., a time-bin qubit decoder). The on-chip encoder 412 may comprise a modulating circuit 402, a laser 404, an attenuator (or deflector) 406, and an MZI 408. In some embodiments, modulating circuit 402 may be configured to modulate the laser 404, and the laser 404 may be configured to produce pulses of photons. The laser 404 may be coupled to an attenuator (or deflector) 406 to reduce the intensity of the photon pulses to about one photon per pulse. The on-chip decoder 414 may comprise an MZI 410 and a bit manipulator circuit 416. The MZI 408 may be optically coupled to the MZI 410 through an optical or quantum line (e.g., an optical waveguide; or, to increase randomness, a non-polarization maintaining optical transmission line). In some embodiments, MZI 410 and MZI 410 may be asymmetric or decoherent MZIs. For example, the device characteristics (e.g., optical path length) of MZI 410 may be different from MZI 408. Accordingly, the MZI 408 and the MZI 410 may be used as incompatible interferometers to generate random, measured time-bin qubits.

In another example embodiment, as shown in FIG. 4B, the MZI-based QRNG chip 420 may comprise an on-chip encoder 432 (e.g., a time-bin qubit encoder) and an on-chip decoder 434 (e.g., a time-bin qubit decoder). The on-chip encoder 432 may comprise a modulating circuit 422, a single photon source 424, an MZI 426, and an MZI 428. In some embodiments, modulating circuit 422 may be configured to modulate the single photon source 424, and the single photon source 424 may be configured to produce pulses of single photons. In this example embodiment, the single photon source 424 performs substantially the same function as the combination of laser 404 and attenuator (or deflector) 406 of the embodiment shown in FIG. 4A. The on-chip decoder 434 may comprise an MZI 430 and a bit manipulator circuit 436. The MZI 426 may be optically coupled to the MZI 428 through a second optical or quantum line (e.g., an optical waveguide; or, to increase randomness, a non-polarization maintaining optical transmission line). The MZI 428 may be optically coupled to the MZI 430 through a second optical or quantum line (e.g., an optical waveguide; or, to increase randomness, a non-polarization maintaining optical transmission line). In some embodiments, MZI 426, MZI 428, and MZI 430 may be asymmetric or decoherent MZIs. For example, the device characteristics (e.g., optical path length) of MZI 430 may be different from MZI 428, 426, or both. Accordingly, MZI 426, MZI 428, and MZI 430 may be used as incompatible interferometers to generate random, measured time-bin qubits.

In yet another example embodiment, as shown in FIG. 4C, the MZI-based QRNG chip 440 may comprise an on-chip encoder 452 (e.g., a time-bin qubit encoder) and an on-chip decoder 454 (e.g., a time-bin qubit decoder). The on-chip encoder 452 may comprise a modulating circuit 442, a single photon source 444, and an MZI 446. In some embodiments, modulating circuit 442 may be configured to modulate the single photon source 444, and the single photon source 444 may be configured to produce pulses of single photons. In this example embodiment, the single photon source 444 performs substantially the same function as the combination of laser 404 and attenuator (or deflector) 406 of the embodiment shown in FIG. 4A. The on-chip decoder 454 may comprise an MZI 448 and a bit manipulator circuit 450. The MZI 446 may be optically coupled to the MZI 448 through an optical or quantum line (e.g., an optical waveguide; or, to increase randomness, a non-polarization maintaining optical transmission line). In some embodiments, MZI 446 and MZI 448 may be asymmetric or decoherent MZIs. For example, the device characteristics (e.g., optical path length) of MZI 446 may be different from MZI 448. Accordingly, MZI 446 and MZI 448 may be used as incompatible interferometers to generate random, measured time-bin qubits.

In some embodiments, the on-chip encoders 412, 432, and 452 and the on-chip decoders 414, 434, and 454 may be configured to respectively generate and measure various time-bin qubits of the set of time-bin qubits based on multiple optical path lengths, such as a first optical path length, a second optical path length different from the first optical path length, and in some embodiments, additional optical path lengths different from the first or the second optical path length. The difference in optical path length used for the generation and measurement of a particular time-bin qubit may thus manifest in several arrangements. For instance, a first optical path length used for generation of a time-bin qubit may be shorter or longer than a second optical path length used for measurement of the time-bin qubit.

The MZI-based QRNG chip 400, 420, or 440 may be further configured to measure the received set of time-bin qubits based on a second optical path length different from the first optical path length used to encode the set of time-bin qubits. The second optical path length may be different from the first optical path length based on a various factors. In some instances, the second optical path length may be different from the first optical path length based on the physical lengths of the two optical paths (e.g., the first optical path may be longer than the second optical path, or vice versa). For example, the first optical path length may comprise a first physical length (e.g., 2.0 microns) of a first optical path in the MZI 408, the second optical path may comprise a second physical length (e.g., 2.5 microns) of a second optical path in the MZI 410, and the first physical length and the second physical length may be different. In some instances, the second optical path length may be different from the first optical path length based on the temperatures of the two optical paths (e.g., the first optical path may be at a higher temperature than the second optical path, or vice versa), such as when the QRNG chip 110 comprises a temperature gradient between the MZI 408 and the MZI 410. For example, the first optical path length may comprise a first temperature (e.g., 60 degrees Fahrenheit) of a first optical path in the MZI 408, the second optical path may comprise a second temperature (e.g., 50 degrees Fahrenheit) of a second optical path in the MZI 410, and the first temperature and the second temperature may be different. In some instances, the second optical path length may be different from the first optical path length based on the media of the two optical paths (e.g., the first optical path may include a portion having a higher refractive index than the corresponding portion of the second optical path, or vice versa). For example, the first optical path length may comprise a first portion of a first optical path in MZI 408 comprising a first index of refraction (e.g., n=1.0), the second optical path length may comprise a second portion of a second optical path in MZI 410 comprising a second index of refraction (e.g., n=1.1), and the first index of refraction and the second index of refraction may be different. In some instances, the second optical path length may be different from the first optical path length based on the optical components included in the two optical paths (e.g., the first optical path but not the second optical path may comprise a phase shifter, or vice versa). In some instances, the difference between the first optical path length and the second optical path length may be shorter than the coherence length to mix up the time of arrival measurement and thereby increase the randomness of the decoded quantum states. In some embodiments a difference between the first optical path length and the second optical path length may be less than a coherence length of a time-bin qubit in the set of time-bin qubits. For example, the coherence length of a time-bin qubit in the set of time-bin qubits may be around 100 meters, and the difference between the first optical path length and the second optical path length may be less than about 500 microns.

The measured set of qubits will thus include a random component insofar as at least one time-bin qubit has been encoded with a first optical path length and was then measured using a second optical path length different from the first optical path length. When this divergence of optical path length occurs for multiple time-bin qubits, the measured set of qubits may comprise a plurality of wildcard time-bin qubits due to the effect of quantum uncertainty introduced into the system by the premeditated use of divergent optical path lengths for encoding and decoding of the set of time-bin qubits. As discussed in further detail with respect to FIG. 6, each wildcard time-bin qubit has some probability of being an error time-bin qubit based on quantum uncertainty. In some embodiments, the first optical path length is not known or received by the on-chip decoder 414, 434, or 454. In some embodiments, the second optical path length is not known or received by the on-chip encoder 412, 432, or 452.

The on-chip decoders 414, 434, and 454 may be configured to transmit, to the session authentication system 102, the decoded set of bits generated by measuring the received set of time-bin qubits. This transmission may occur either via one or more communications networks 108 or via a non-network communication path (although in embodiments where the on-chip decoder 414, 434, or 454 comprises a component of the session authentication system 102, internal conveyance of the decoded set of bits may occur via an internal system bus (not shown for sake of brevity), or may not need to occur at all). The session authentication system 102 is configured to then generate a number based on the decoded set of bits (e.g., using all of the qubits in the decoded set of bits without discarding any of the qubits in the decoded set of bits). In some embodiments, the decoded set of bits may comprise an entirety of the generated number. But in other embodiments, the decoded set of bits may comprise a plurality of wildcard time-bin qubits comprising one or more error time-bin qubits, and the generated number may comprise a binary number comprising the one or more error time-bin qubits but not all of the other qubits in the decoded set of bits (e.g., the error time-bin qubits are not discarded but one or more "correctly" measured qubits are discarded). In some embodiments, either: (i) the first optical path length is not transmitted by the on-chip encoder 412, 432, or 452; or (ii) the second optical path length is not transmitted by the on-chip decoder 414, 434, or 454. In some embodiments, the generated number cannot be reproduced without the first optical path length, the first set of time-bin qubits, and the second optical path length. But even with all of this information, the generated number cannot reliably be recreated due to the randomization introduced by the quantum effect triggered from use of divergent optical path lengths during encoding and decoding of the set of time-bin qubits. In some embodiments, the on-chip decoder 414, 434, or 454 may be configured to transmit electronic information indicative of the second optical path length to the on-chip encoder 412, 432, or 452, the session authentication system 102, or both. In some embodiments, the on-chip decoder 414, 434, or 454 may be configured to not transmit any electronic information indicative of the second optical path length to any other device.

In some embodiments, the session authentication system 102 may be configured to generate a time-dependent quantum encoding schedule comprising a first plurality of optical path lengths respectively corresponding to a first plurality of time periods. The session authentication system 102 may be configured to transmit the time-dependent quantum encoding schedule to the MZI-based QRNG chip 400, 420, or 440. The MZI-based QRNG chip 400, 420, or 440 may be configured to receive the time-dependent quantum encoding schedule and encode (e.g., using on-chip encoder 412, 432, or 452) qubits based on the time-dependent quantum encoding schedule. For example, an example time-dependent quantum encoding schedule may comprise electronic information indicative of instructions to encode qubits based on a first optical path length during a first time period (e.g., a first 10 nanoseconds), a second optical path length during a second time period (e.g., the next 20 nanoseconds), a third optical path length during a third time period (e.g., the next 50 nanoseconds), and a fourth optical path length during a fourth time period (e.g., the next 20 nanoseconds), after which the time-dependent quantum encoding schedule may repeat.

In some embodiments, the session authentication system 102 may be configured to generate a time-dependent quantum decoding schedule comprising a second plurality of optical path lengths respectively corresponding to a second plurality of time periods. The session authentication system 102 may be configured to transmit the time-dependent quantum decoding schedule to the MZI-based QRNG chip 400, 420, or 440. The MZI-based QRNG chip 400, 420, or 440 may be configured to receive the time-dependent quantum decoding schedule and measure (e.g., using on-chip decoder 414, 434, or 454) qubits based on the time-dependent quantum decoding schedule. For example, an example time-dependent quantum decoding schedule may comprise electronic information indicative of instructions to measure time-bin qubits based on a first optical path length during a first time period (e.g., a first 5 nanoseconds), a second optical path length during a second time period (e.g., the next 30 nanoseconds), and third optical path length during a third time period (e.g., the next 10 nanoseconds), after which the time-dependent quantum decoding schedule may repeat.

It will be appreciated that other patterns of optical path length selection may be utilized as well. For instance, the session authentication system 102 may be configured to generate a unit-dependent quantum encoding schedule, a unit-dependent quantum decoding schedule, or both. The session authentication system 102 may be configured to transmit the unit-dependent quantum encoding schedule to the MZI-based QRNG chip 400, 420, or 440. The MZI-based QRNG chip 400, 420, or 440 may be configured to receive the unit-dependent quantum encoding schedule and generate (e.g., using on-chip encoder 412, 432, or 452) time-bin qubits based on the unit-dependent quantum encoding schedule. The session authentication system 102 may be further configured to transmit the unit-dependent quantum decoding schedule to the MZI-based QRNG chip 400, 420, or 440. The MZI-based QRNG chip 400, 420, or 440 may be configured to receive the unit-dependent quantum decoding schedule and measure (e.g., using on-chip decoder 414, 434, or 454) time-bin qubits based on the unit-dependent quantum decoding schedule. For example, an example unit-dependent quantum encoding schedule may comprise electronic information indicative of instructions to encode time-bin qubits based on a first optical path length for a first number of time-bin qubits (e.g., a first 2 qubits), a second optical path length for a second number of time-bin qubits (e.g., the next 5 qubits), a third optical path length for a third number of time-bin qubits (e.g., the next 3 qubits), and a fourth optical path length during for a fourth number of time-bin qubits (e.g., the next 2 qubits), after which the unit-dependent quantum encoding schedule may repeat. As another example, an example unit-dependent quantum decoding schedule may comprise electronic information indicative of instructions to measure time-bin qubits based on a first optical path length for a first number of time-bin qubits (e.g., a first 2 qubits), a second optical path length for a second number of time-bin qubits (e.g., the next 4 qubits), and a third optical path length during for a third number of time-bin qubits (e.g., the next 2 qubits), after which the unit-dependent quantum decoding schedule may repeat. Other encoding and decoding patterns may be utilized as well without departing from the scope of the present disclosure.

It will further be appreciated that the optical path length or optical path lengths used by the on-chip encoder 412, 432, or 452 may be determined without reliance on the optical path length or optical path lengths used by the on-chip decoder 414, 434, or 454. Similarly, the optical path length or optical path lengths used by the on-chip decoder 414, 434, or 454 may be determined without reliance on the optical path length or optical path lengths used by the on-chip encoder 412, 432, or 452. One example where the determination of an optical path length or optical path lengths is performed without reliance on another optical path length or optical path lengths is when the optical path length or optical path lengths used by the on-chip encoder 412, 432, or 452 or the on-chip decoder 414, 434, or 454 is or are determined without knowledge of the optical path length or optical path lengths used by the other of the on-chip encoder 412, 432, or 452 or the on-chip decoder 414, 434, or 454. After all, determination of a first optical path length without knowledge of a second optical path length necessarily means that the determination of the first optical path length occurs without reliance on the second optical path length.

However, lack of knowledge is not the only situation in which there can be non-reliance. Another situation in which there can be non-reliance is where the entity performing the determination of a first optical path length has knowledge of a second optical path length, but that knowledge is not used by the entity in the determination of the first optical path length. For example, the optical path length to be used by the on-chip encoder 412, 432, or 452 may be determined without reference to the corresponding optical path length used by the on-chip decoder 414, 434, or 454 even though the entity determining the optical path length to be used by the on-chip encoder 412, 432, or 452 has knowledge of the optical path length used by the on-chip decoder 414, 434, or 454. Similarly, the optical path length to be used by the on-chip decoder 414, 434, or 454 may be determined without reference to the corresponding optical path length used by the on-chip encoder 412, 432, or 452 even though the entity determining the optical path length or set of quantum to be used by the on-chip decoder 414, 434, or 454 may have knowledge of the optical path length used by the on-chip encoder 412, 432, or 452.

In some embodiments, there may be mutual non-reliance, such that the optical path length used by the on-chip encoder 412, 432, or 452 is determined without reliance on the optical path length used by the on-chip decoder 414, 434, or 454, and the optical path length used by the on-chip decoder 414, 434, or 454 is also determined without reliance on the optical path length used by the on-chip encoder 412, 432, or 452.

In some embodiments, the session authentication system 102, the MZI-based QRNG chip 400, 420, or 440, or a combination thereof may determine an optical path length for use by the on-chip encoder 412, 432, or 452 using a pseudo-random optical path length selection technique and never thereafter transmit information about the selected optical path length. In other embodiments, the on-chip encoder 412, 432, or 452 may itself select an optical path length for use and may utilize that selected optical path length without ever transmitting information about the selected optical path length to any other device. Similarly, the session authentication system 102, the MZI-based QRNG chip 400, 420, or 440, or a combination thereof may determine an optical path for use by the on-chip decoder 414, 434, or 454 using a pseudo-random optical path length selection technique and never thereafter transmit information about the selected optical path length.

By way of example, in some embodiments, the selection of an appropriate optical path length may utilize a frequency calculation procedure in which a selection frequency for each optical path length may be monitored such that the likelihood that an unselected optical path length is selected during subsequent selections is increased until an unselected optical path length is selected. Said differently, in an instance in which a first optical path length is initially selected, the remaining optical path lengths may be weighted such that selection of these optical path lengths on subsequent selection operations is more likely as compared to the first optical path length. Once these remaining optical path lengths are selected in the future, however, their corresponding weightings may decrease relative to still other unselected optical path lengths. To duplicate this pseudo-random optical path length selection technique, an intruder would need to have insight into multiple different iterations of the pseudo-random number generation technique, and even then would need to deduce the weighting scheme. While a frequency calculation procedure is outlined above for selection of an optical path length for the on-chip encoder 412, 432, or 452 or the on-chip decoder 414, 434, or 454, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the optical path length without departing from the scope of the disclosure.

Double-Slit-Based QRNG Chip

Figure 5A:
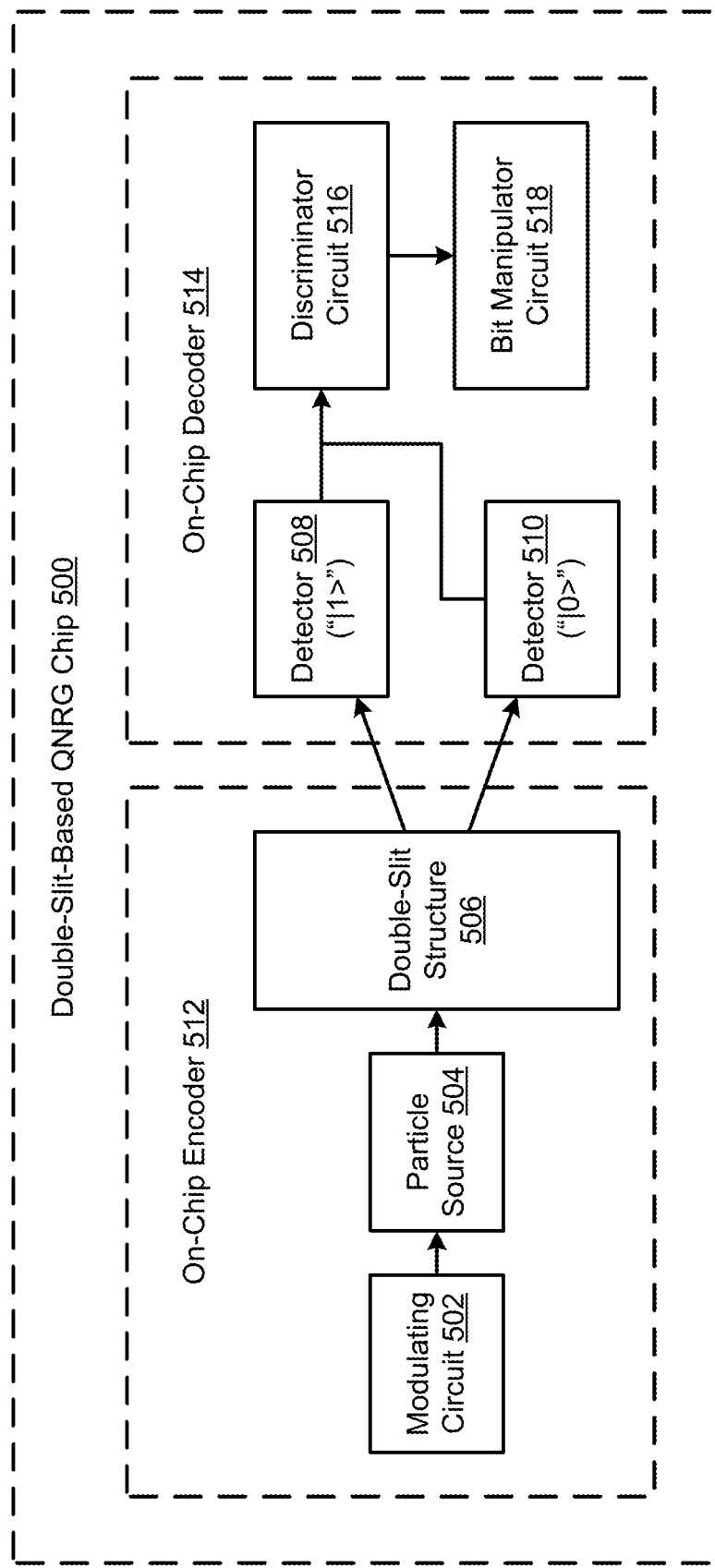
FIG. 5A illustrates a schematic block diagram of, and FIG. 5B illustrates example series of particles generated and detected by, an example double-slit-based QRNG chip that may be involved in some example embodiments described herein.
Figure 5B:
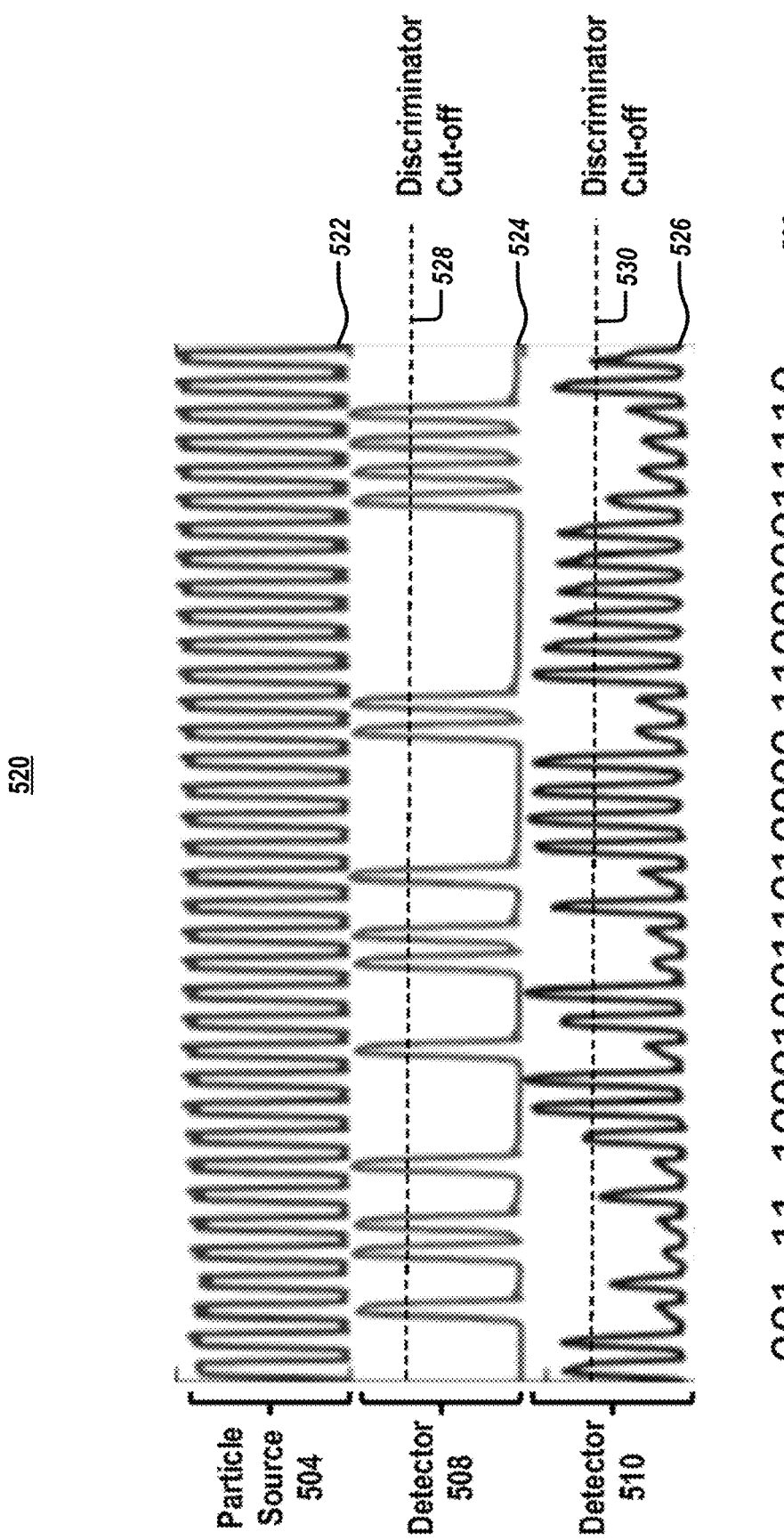

Turning to FIGS. 5A-5B, the double-slit-based QRNG chip 500 is configured to detect series of particles (e.g., series of single quantum particles such as single photons or single electrons) transmitted through a double-slit structure in order to generate a decoded set of bits that may be used by the session authentication system 102, session server 116, or both to generate a random number that may be further used to generate a session key or a random seed (e.g., a set of bits that is randomized due to quantum effects such as the principles of quantum uncertainty and the wave-particle duality of quantum mechanics) for session key generation or seed for a pseudo-random number generation used to establish a secure session.

In one illustrative example embodiment, the double-slit-based QRNG chip 500 may use a particle source to generate pulses of single quantum particles. Each particle may propagate towards and impinge on a barrier (e.g., a double-slit structure) with two slits (e.g., two openings) inscribed on it. In some embodiments, the particle source may emit quantum particles which are collimated with respect to direction and momentum. The size and dimensions of each slit, along with the distance between the two slits, are designed to fall within the coherency of the quantum particle wave. As such, when the quantum particle faces the two slits, the wave function is aware of both slits. This causes the wave function of the particle to split into two wave functions. Accordingly, the two wave functions going through the two slits form an interference pattern (e.g., an electron interference pattern, a photon interference pattern) downstream of the barrier. If one of the slits gets covered for one electron or photon, and the other slit gets covered for the next electron or photon, the interference pattern collapses to form a classical mechanics pattern. Additionally, knowledge of the state of the particle collapses the uncertainty of its states and brings it to a known state. However, this does come at the cost of losing the information on the quantum conjugate variable. For instance, measuring position causes a large uncertainty with respect to momentum, while measuring energy causes a large uncertainly with respect to time. Once a detector detects the particle, the coherency breaks down and one of the two openings is chosen.

Generally, once either of the detectors fires and registers the detection of the quantum particle, the interference pattern collapses and there remains a 50-50 chance of detection at either detector. As such, when the first detector (e.g., detector 508) fires (e.g., measures a value above a first discriminator cut-off value), the on-chip decoder 514 may register a "1." Similarly, when the second detector (e.g., detector 510) fires (e.g., measures a value above a second discriminator cut-off value, which may be the same or different from the first discriminator cut-off value), the on-chip decoder 514 may register a "0." The double-slit-based QRNG chip 500 may further comprise a discriminator, a bit manipulator, or both coupled to the first detector and the second detector for generating a random bit stream. Accordingly, after detecting a sequence of particles, the double-slit-based QRNG chip 500 may generate a bit stream that is truly random.

As shown in FIG. 5A, the double-slit-based QRNG chip 500 may comprise: an on-chip encoder 512 comprising modulating circuit 502, particle source 504, and double-slit structure 506; and an on-chip decoder 514 comprising detector 508, detector 510, discriminator circuit 516, and bit manipulator circuit 518. In some embodiments, the particle source 504 (or in some instances, the combination of the modulating circuit 502 and the particle source 504) may be configured to generate a series of particles (e.g., pulse stream 522 shown in FIG. 5B), such as a series of photons or a series of electrons. The particle source 504 may be any suitable particle source, such as a single electron emission source comprising an electron gun (e.g., a cathode ray tube; a hot cathode that emits electrons through a control grid followed by electromagnetic accelerating elements after which a well collimated electron bean emerges); a solid-state single electron emission source comprising a quantum dot connected to a quantum conductor via a tunnel barrier; a laser combined with an attenuator or deflector; a single photon source; a solid-state single photon emitter comprising a quantum dot; any other suitable particle source; or a combination thereof.

The particle source 504 then may transmit the series of particles through the double-slit structure 506 positioned downstream of the particle source 504. The double-slit structure 506 may comprise a first slit and a second slit through which particles may be transmitted. The size and dimensions of each slit, along with the distance between the two slits, may designed to fall within the coherence length of the particles. In some embodiments, the double-slit structure 506 may comprise a barrier, such as a photon barrier or an electron barrier. In some embodiments, a distance between the first slit and the second slit of the double-slit structure 506 may be less than a coherence length of a particle in the series of particles. For example, the coherence length of a particle in the series of particles may be around 100 centimeters, and the distance between the first slit and the second slit of the double-slit structure may be less than about 500 microns.

The detector 508 may be coupled to the first slit of the double-slit structure 506 and configured to detect a first subseries of particles transmitted through the first slit to generate a first detected subseries of particles (e.g., pulse stream 524 shown in FIG. 5B). The detector 510 may be coupled to the second slit of the double-slit structure 506 and configured to detect a second subseries of particles transmitted through the second slit to generate a second detected subseries of particles (e.g., pulse stream 526 shown in FIG. 5B).

The on-chip decoder 514 may be configured to decode the first detected subseries of particles and the second detected subseries of particles to generate a decoded set of bits (e.g., decoded set of bits 532 shown in FIG. 5B). For example, the on-chip decoder 514 may comprise a discriminator circuit 516 coupled to the first detector 508 and the second detector 510 and configured to: apply a first discriminator cut-off 528 to the first detected subseries of particles (e.g., pulse stream 524) to generate a first discriminated subseries of particles; and apply a second discriminator cut-off 530 to the second detected subseries of particles (e.g., pulse stream 526) to generate a second discriminated subseries of particles. The on-chip decoder 514 may further comprise a bit manipulator circuit 518 coupled to the discriminator circuit 516 and configured to convert the first discriminated subseries of particles and the second discriminated subseries of particles into the decoded set of bits 532 (e.g., "00111100010011010000110000011110").

FIG. 5B illustrates various series of particles and bits that may be generated by the double-slit-based QRNG chip 500. For example, the pulse stream 522 may represent a series of particles generated by particle source 504, which fires a particle at equal times with equal probabilities. The pulse stream 524 may represent a first subseries of particles detected by detector 508 (e.g., detected when detector 508 fires). A first discriminator cut-off 528, which may be calibrated for the detector 508, may be used to eliminate noise and pick up clear particle detection signals. The pulse stream 526 may represent a second subseries of particles detected by detector 510 (e.g., detected when detector 510 fires). A second discriminator cut-off 530, which may be calibrated for the detector 510, may be used to eliminate noise and pick up clear particle detection signals. In some embodiments, the first discriminator cut-off 528 and the second discriminator cut-off 530 may be different. For instance, as shown in FIG. 2B, detector 510 may be a noisy detector that may result in an increase in the amount of "1"s than "0"s, or vice versa, in the decoded set of bits 532 depending on the setup, beam collimation, alignment, and detector performances. As a result, when the noise level of detector 510 is different than the noise level of detector 508, the decoded set of bits 532 may not have an exact 50-50 bit stream (e.g., a bit stream having a 50-50 ratio of "0"s and "1"s). Nonetheless, the decoded set of bits 532 is completely random and, in some instances, there is no way for any person, device, or entity to determine what the bit stream is going to be.

In some embodiments, such as gaming applications that are sensitive to the decoded set of bits 532 being a 50-50 bit stream, the double-slit-based QRNG chip 500 may be calibrated, monitored, and periodically re-calibrated to ensure 50-50 reproduction of "0"s and "1"s. For example, the double-slit-based QRNG chip 500 may comprise monitoring circuitry to monitor the decoded set of bits 532 and adjust voltages, positions, discriminator cut-offs, or any other suitable parameter or combination of parameters to generate a 50-50 bit stream.

Example Decoded Set of Bits

FIG. 6 illustrates an example table 600 comprising example sets of bits. As shown in FIG. 6, example table 600 includes an on-chip encoder (e.g., one of on-chip encoders 112A-112N) that encodes a first set of bits ("11000110") to generate a set of qubits (e.g., an eight qubit sequence). The on-chip encoder transmits the generated set of qubits to an on-chip decoder (e.g., one of on-chip decoders 114A-114N). The on-chip decoder receives the set of qubits and measures the set of qubits to generate a decoded set of bits. The decoded bit is referred to herein as a "wildcard bit" that has a first probability (e.g., a fifty percent chance) of being correct and a second probability (e.g., a fifty percent chance) of being incorrect. In the example illustrated in FIG. 6, the on-chip decoder generates a decoded set of bits ("10000010") that includes four wildcard bits (e.g., the second bit "0"; the fourth bit "0"; the sixth bit "0"; and the eighth bit "0") and two error bits (e.g., the second bit "0" and the sixth bit "0").

It will be understood, however, that even if the encoded set of bits were stored and decoded a second time, the 50% probability of decoding accuracy when using the "wrong" quantum basis will ensure that a new decoded set of bits may not be the same as the originally decoded set of bits. For instance, a new decoded set of bits ("11000010") generated by the on-chip decoder may correctly measure the second bit, but may measure the sixth bit in error. Accordingly, even if a perpetrator were to deduce the original set of bits ("11000110"), there is no way for that perpetrator to deduce whether the originally decoded set of bits ("10000010") or the new decoded set of bits ("11000010") is the number generated from the original set of bits. Thus, the decoded set of bits may be used as a session ID or may be used as the seed for a pseudo-random number generator that generates a session ID. Although an 8 qubit example is illustrated in FIG. 6, in some embodiments, a larger number of bits may be utilized (e.g., 256 bits, 1048 bits). Regardless of the number of bits used, a chance of error will remain for each bit measured using the incorrect quantum basis. In some embodiments, the amount of randomness introduced into the decoded set of bits may be increased by increasing the decoherence between the on-chip encoder and the on-chip decoder.

In some embodiments, FIG. 6 may illustrate an example table 600 comprising example sets of time-bin qubits. For example, example table 600 may include a time-bin qubit encoder (e.g., on-chip encoder 112) that generates a set of time-bin qubits ("11000110") using a first MZI (e.g., comprising a first optical path length). The time-bin qubit encoder transmits the generated set of time-bin qubits over a quantum line to a time-bin qubit decoder (e.g., on-chip decoder 114) or, in some instances, a switching device. The time-bin qubit decoder receives the set of time-bin qubits from the time-bin qubit encoder (or, in some instances, from the switching device) and measures the received set of time-bin qubits using a second MZI (e.g., comprising a second optical path length different from the first optical path length) to generate a decoded set of bits. When the time-bin qubit decoder measures a time-bin qubit, the measured time-bin qubit is referred to herein as a "wildcard time-bin qubit" that has a first probability (e.g., a fifty percent chance) of being correct and a second probability (e.g., a fifty percent chance) of being incorrect based on quantum uncertainty and the indeterminacy of quantum states. In the example illustrated in FIG. 6, the time-bin qubit decoder generates a decoded set of bits ("10000010") that includes eight wildcard time-bin qubits (e.g., the first measured time-bin qubit "1"; the second measured time-bin qubit "0"; the third measured time-bin qubit "0"; the fourth measured time-bin qubit "0"; the fifth measured time-bin qubit "0"; the sixth measured time-bin qubit "0"; the seventh measured time-bin qubit "1"; and the eighth measured time-bin qubit "0") and two error time-bin qubits (e.g., the second measured time-bin qubit "0" and the sixth measured time-bin qubit "0").

It will be understood, however, that even if the time-bin qubit decoder were to store the received set of time-bin qubits and measure the received set of time-bin qubits a second time, the probability of decoding accuracy when using the second MZI will ensure that a new decoded set of bits may not be the same as the original decoded set of bits. For instance, the new decoded set of bits generated by the time-bin qubit decoder may correctly measure the second time-bin qubit, but may measure the sixth time-bin qubit in error. Accordingly, even if a perpetrator were to deduce the transmitted set of time-bin qubits ("11000110"), there is no way for that perpetrator to deduce the decoded set of bits ("10000010") from the original set of time-bin qubits. Thus, the session authentication system may use the decoded set of bits ("10000010") as a session ID or as the seed for a pseudo-random number generator that generates a session ID. Although an 8 time-bin qubit example is illustrated in FIG. 6, in some embodiments, a larger number of time-bin qubits may be utilized (e.g., 256 qubits, 1048 qubits). Regardless of the number of time-bin qubits used, a chance of error will remain for each qubit measured using the second MZI.

In some embodiments, the example set of bits may be the decoded set of bits 532 (e.g., "0011110001001101000011000011110") discussed previously with reference to FIG. 5B.

Having described specific components of example devices and circuitries involved in various embodiments contemplated herein, example procedures for session authentication are described below in connection with FIG. 7.

Example Operations for Single Chip QRNG

Figure 7:
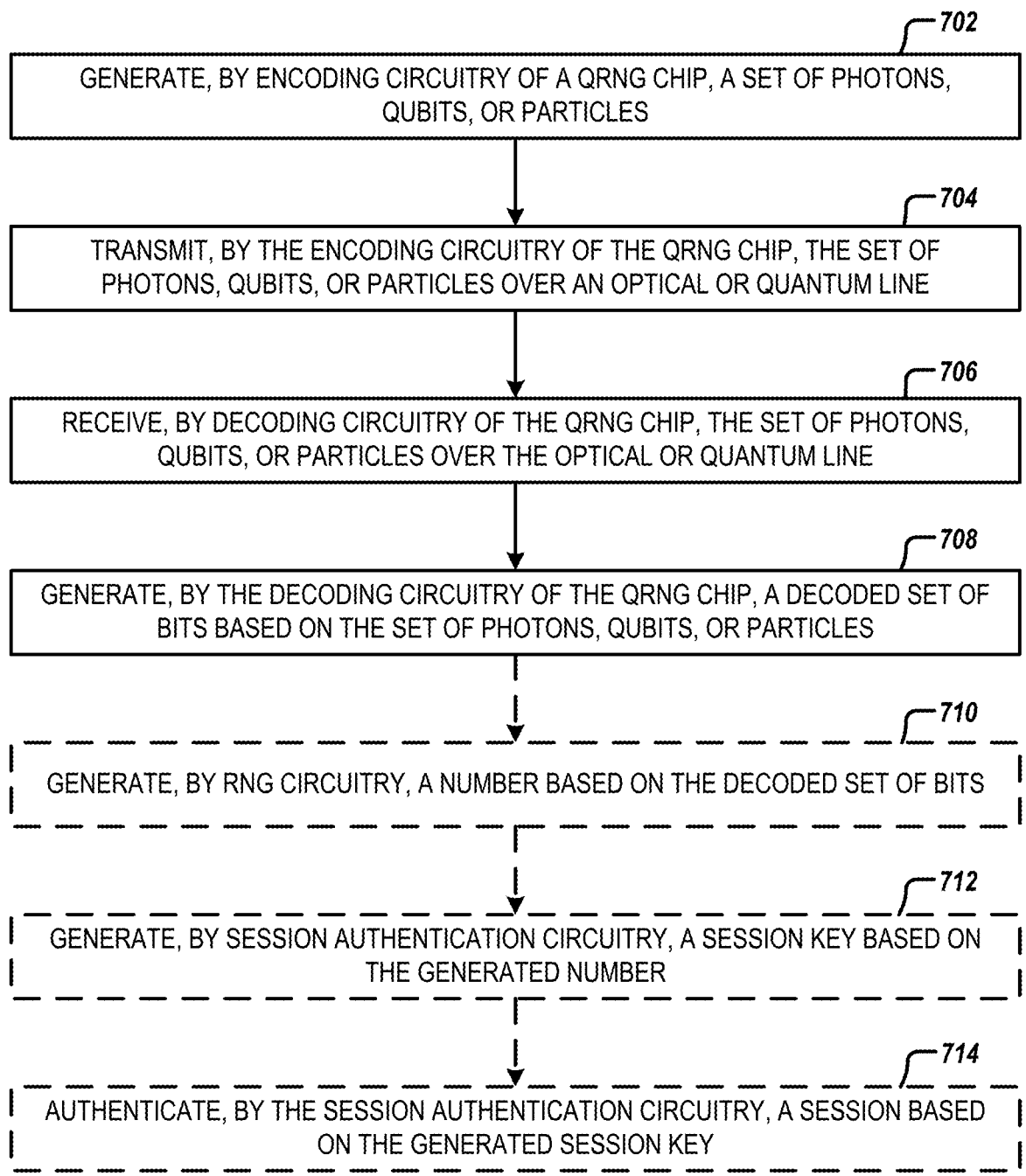
FIG. 7 illustrates an example flowchart for session authentication in accordance with some example embodiments described herein.

Turning to FIG. 7, an example flowchart 700 is illustrated that contains example operations for quantum random number generation according to some example embodiments.

The operations illustrated in FIG. 7 may, for example, be performed by one or more of the apparatuses shown in FIGS. 1 and 3-5, and described in FIGS. 2A-2C, such as: apparatus 200, which represents an example session authentication system 102, a session server 116, or both; apparatus 220, which represents an example client device 118; or apparatus 240, which represents an example QRNG chip (e.g., QRNG chip 110, 300, 320, 400, 420, 440, or 500). The various operations described in connection with FIG. 7 may be performed by one of apparatuses 200, 220, or 240, and by or through the use of one or more of processing circuitry 202, memory 204, input-output circuitry 206, classical communications circuitry 208, quantum basis determination circuitry 210, optical path length determination circuitry 211, RNG circuitry 212, PRNG circuitry 214, session authentication circuitry 216, QKD circuitry 218, quantum communications circuitry 222, encoding circuitry 224, decoding circuitry 226, sensor circuitry 228, switching circuitry 230, any other suitable circuitry, and any combination thereof.

As shown by operation 702, an apparatus 240 (e.g., comprising a QRNG chip 110, 300, 320, 400, 420, 440, or 500) includes means for generating a set of photons, qubits, or particles. The means for generating the set of photons, qubits, or particles may be any suitable means, such as encoding circuitry 224 (comprising, for instance, one of on-chip encoders 112A-112N, 312, 332, 412, 432, 452, or 512) of the apparatus 240, as described with reference to FIGS. 1-5 above. For example, encoding circuitry 224 may be configured to generate a series of photons as described with reference to FIGS. 1, 2, and 3A-3B. In another example, encoding circuitry 224 may be configured to generate a set of time-bin qubits based on a first optical path length as described with reference to FIGS. 1, 2, and 4A-4C. In yet another example, encoding circuitry 224 may be configured to generate a series of particles as described with reference to FIGS. 1, 2, and 5A-5B. It will be understood that although encoding circuitry 224 may be configured to generate a set of photons, qubits, or particles, other circuitry (e.g., quantum basis determination circuitry 210; optical path length determination circuitry 211) of the apparatus 240, 200, or both, or other components (e.g., modulating circuit 302, 322, 402, 422, 442, 502; laser 304; laser 404; attenuator (or deflector) 306, 406; single photon source 324, 424, 444; particle source 504; MZI 408, 426, 428, 446; double-slit structure 506; or a combination thereof) of the QRNG chip may perform preliminary operations facilitating performance of operation 702.

Optionally, the apparatus 240 includes means for receiving a control signal indicative of an instruction to generate a series of photons, a set of time-bin qubits, or a series of particles. The means for receiving the control signal may be any suitable means, such as classical communications circuitry 208 that comprises a component of encoding circuitry 224 of the apparatus 240 as described with reference to FIGS. 2A-2C above. In some embodiments, the encoding circuitry 224 may be configured, at operation 702, to generate the series of photons, the set of time-bin qubits, or the series of particles in response to receipt of the control signal.

As shown by operation 704, the apparatus 240 includes means for transmitting the set of photons, qubits, or particles over an optical line or a quantum line to decoding circuitry 226 (comprising, for instance, one of on-chip decoders 114A-114N, 314, 334, 414, 434, 454, or 514) of the apparatus 240, as described with reference to FIGS. 1-5 above. The means for transmitting the set of photons, qubits, or particles may be any suitable means, such as quantum communications circuitry 222 that comprises a component of the encoding circuitry 224 of the apparatus 240 as described with reference to FIGS. 2A-2C above. The optical line or quantum line may be any suitable optical line or quantum line. In some instances, the means for transmitting the set of particles may transmit the particles towards a barrier with two openings (e.g., double-slit structure 506 comprising a first slit and a second slit) positioned between the on-chip encoder and the on-chip decoder.

As shown by operation 706, the apparatus 240 includes means for receiving the set of photons, qubits, or particles over the optical line or quantum line from the on-chip encoder. The means for receiving the set of photons, qubits, or particles may be any suitable means, such as quantum communications circuitry 222 that comprises a component of decoding circuitry 226 of the apparatus 240 as described with reference to FIGS. 1-5. In some instances, the means for receiving the set of particles may receive the particles as they exit one of two openings in a barrier (e.g., one of two slits in double-slit structure 506) positioned between the on-chip encoder and the on-chip decoder.

As shown by operation 708, the apparatus 240 includes means for generating a decoded set of bits based on the received set of photons, qubits, or particles. The means for generating the decoded set of bits may be any suitable means, such as decoding circuitry 226 of the apparatus 240, as described with reference to FIGS. 1-5 above. For example, decoding circuitry 226 may be configured to decode, based on the determined set of quantum bases, the series of photons to generate a decoded set of bits as described with reference to FIGS. 1, 2, and 3A-3B. In another example, encoding circuitry 224 may be configured to measure, based on a second optical path length different from the first optical path length, the set of time-bin qubits to generate a decoded set of bits as described with reference to FIGS. 1, 2, and 4A-4C. In yet another example, encoding circuitry 224 may be configured to: detect a first subseries of particles transmitted through the first slit to generate a first detected subseries of particles; detect a second subseries of particles transmitted through the second slit to generate a second detected subseries of particles; and decode the first detected subseries of particles and the second detected subseries of particles to generate a decoded set of bits as described with reference to FIGS. 1, 2, and 5A-5B. It will be understood that although decoding circuitry 226 may be configured to generate a decoded set of bits, other circuitry (e.g., sensor circuitry 228) of the apparatus 240, 200, or both, or other components (e.g., qubit decoder 308, 326; MZI 410, 430, 448; detector 508, 510; discriminator circuit 516; bit manipulator circuit 310, 328, 416, 436, 450, 518; or a combination thereof) may perform ancillary operations facilitating performance of operation 708.

As shown by optional operation 710, an apparatus 200 (e.g., comprising session authentication system 102, session authentication system server device 104, or session server 116) thereafter includes means for generating a number based on the decoded set of bits. The means for generating the number may be any suitable means, such as RNG circuitry 212 described with reference to FIGS. 2A-2C. For instance, the decoded set of bits may be the set of bits "10000010". In one example, the generated number may be the decoded set of bits "10000010". In another example, the generated number may be a number that includes the decoded set of bits in its entirety, such as "1000001000000000". It will be understood that in embodiments where the apparatus 200 comprises a distinct apparatus from apparatus 240, an intervening operation may take place in which the apparatus 240 comprises means, such as classical communications circuitry 208, for transmitting the decoded set of bits to the apparatus 200 (and the apparatus 200 includes corresponding classical communications circuitry 208 for receiving the decoded set of bits).

As shown by optional operation 712, the apparatus 200 further includes means for generating a session key based on the generated number. The means for generating the session key may be any suitable means, such as RNG circuitry 212, PRNG circuitry 214, session authentication circuitry 216, QKD circuitry 218, or a combination thereof. For example, the PRNG circuitry 214 may be configured to use the generated number as a seed for pseudo-random number generation, and to generate a pseudo-random number based on the seed, and then to transmit the pseudo-random number to the session authentication circuitry 216. The session authentication circuitry 216 may receive the pseudo-random number and generate the session key based on the pseudo-random number. In some instances, session authentication circuitry 216 may receive a number directly from RNG circuitry 212 and may generate the session key based directly on the generated number. In this regard, in some embodiments, the generated number may be the session key. In other instances, the pseudo-random number may be the session key. In still other instances, the session authentication circuitry 216 may perform a transformation on the pseudo-random number (e.g., convolution with another variable, such as time) to arrive at the session key. In some instances, the decoded set of bits may comprise at least one error bit, and the session authentication circuitry 216 may generate the session key based at least in part on the at least one error bit. In some instances, the decoded set of bits may comprise at least one wildcard bit, and the session authentication circuitry 216 may generate the session key based at least in part on the at least one wildcard bit.

Finally, as shown by optional operation 714, the apparatus 200 includes means, such as communications circuitry 208, for using the generated session key for session authentication of a client device. For instance, the apparatus 200 may include means for transmitting the generated session key to a client device (e.g., one of client devices 118A-118N). This transmission may be controlled by a session server (e.g., one of session servers 116A-116N, and may invoke QKD circuitry 218 to effect secure transmission of the session key. As another example, the apparatus 200 may thereafter use the generated session key to authenticate access by one or more client devices 118A-118N to a session maintained by a session server.

It will be understood that although optional operations 712 and 714 are described above to illustrate practical applications of some example embodiments described herein, a random number generated in optional operation 710 may in other embodiments be used for a variety of additional or alternative purposes (e.g., for gaming devices, statistics, cryptography, or the like) that may not necessarily fall within the context of session authentication.

As noted previously, there are many advantages of these and other embodiments described herein. In all cases, however, example embodiments of the present disclosure provide wide ranging benefits stemming from the generation of numbers that have truly random elements, and which in turn facilitate many heretofore unrealized opportunities, such as the generation of a session ID that cannot be reproduced by a third party.

In some embodiments, the above-described operations may not necessarily occur in the order depicted in FIG. 7, and in some cases one or more of the operations depicted in FIG. 7 may occur substantially simultaneously, or additional steps may be involved before, after, or between any of the operations shown in FIG. 7.

FIG. 7 thus illustrates a flowchart describing the operation of various systems (e.g., session authentication system 102 described with reference to FIG. 1), apparatuses (e.g., apparatus 200 and apparatus 240 described with reference to FIGS. 2A-2C), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200, 240) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 7 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the session authentication system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for quantum random number generation, the system comprising:
   a quantum random number generation chip comprising
      encoding circuitry configured to
         generate a series of photons, and
         transmit the series of photons over an optical line, and
      decoding circuitry configured to
         determine a set of quantum bases to use for measurement,
         receive the series of photons over the optical line, and
         decode, based on the determined set of quantum bases, the series of photons to generate a decoded set of bits.

2. The system of claim 1, wherein the decoding circuitry is configured to receive the series of photons while they are not in a well-defined quantum state.

3. The system of claim 1, wherein the series of photons comprise a series of non-polarized photons.

4. The system of claim 3, wherein a non-polarized photon comprises a photon whose polarization has not been measured.

5. The system of claim 1, wherein the optical line comprises a non-polarization maintaining optical line.

6. The system of claim 1,
   wherein the decoding circuitry comprises a bit manipulator circuit,
   wherein the decoding circuitry is configured to decode the series of photons by measuring a polarization of the series of photons using the determined set of quantum bases, and
   wherein the bit manipulator circuit is configured to convert the measured polarization of the series of photons into the decoded set of bits.

7. The system of claim 1, wherein the encoding circuitry comprises:
   a laser configured to generate light; and
   an attenuator or deflector, wherein the attenuator or deflector is configured to transform the generated light into the series of photons.

8. The system of claim 1, wherein the encoding circuitry comprises:
   a single photon source configured to generate the series of photons.

9. The system of claim 1, wherein the encoding circuitry comprises:
   a modulating circuit configured to generate the series of photons.

10. The system of claim 1, wherein the set of quantum bases comprises a time-dependent decoding schedule comprising a plurality of quantum bases respectively corresponding to a plurality of time periods, wherein the set of quantum bases comprises the plurality of quantum bases.

11. The system of claim 1, wherein the set of quantum bases comprises a unit-dependent decoding schedule comprising a plurality of quantum bases respectively corresponding to a plurality of numbers of bits, wherein the set of quantum bases comprises the plurality of quantum bases.

12. The system of claim 1, wherein the decoding circuitry is configured to not transmit electronic information indicative of the set of quantum bases.

13. The system of claim 1, wherein the set of quantum bases comprises a pair of orthogonal photonic polarization states.

14. The system of claim 13, wherein the pair of orthogonal photonic polarization states are selected at least partially from the group consisting of a pair of rectilinear photonic polarization states, a pair of diagonal photonic polarization states, and a pair of circular photonic polarization states.

15. The system of claim 1, wherein the decoding circuitry is further configured to:

receive a control signal indicative of an instruction to initiate decoding based on the set of quantum bases; and in response to receiving the control signal, decode the series of photons based on the set of quantum bases.

16. The system of claim 1, further comprising session authentication circuitry configured to generate a session key based on the decoded set of bits.

17. The system of claim 16, wherein a session server comprises the session authentication circuitry.

18. The system of claim 16, further comprising:

random number generation circuitry configured to generate a number based on the decoded set of bits, wherein the session authentication circuitry is configured to generate the session key by setting the session key equal to the generated number, or using the generated number as a seed in a pseudo-random number generation technique, wherein an output of the pseudo-random number generation technique comprises the session key.

19. A method for quantum random number generation, the method comprising:

generating, by encoding circuitry of a quantum random number generation chip, a series of photons;

transmitting, by the encoding circuitry of the quantum random number generation chip, the series of photons over an optical line;

determining, by decoding circuitry of the quantum random number generation chip, a set of quantum bases to use for measurement;

receiving, by the decoding circuitry of the quantum random number generation chip, the series of photons over the optical line; and decoding, by the decoding circuitry of the quantum random number generation chip, the series of photons on the determined set of quantum bases to generate a decoded set of bits.

20. A computer program product for quantum random number generation, the computer program product comprising at least one non-transitory computer-readable storage medium storing program instructions that, when executed, cause a quantum random number generation chip to:

generate a series of photons;

transmit the series of photons over an optical line;

determine a set of quantum bases to use for measurement;

receive the series of photons over the optical line; and decode, based on the determined set of quantum bases, the series of photons to generate a decoded set of bits.

* * * * *